United States Patent
Ng et al.

(10) Patent No.: US 8,537,132 B2
(45) Date of Patent: Sep. 17, 2013

(54) ILLUMINATED TOUCHPAD

(75) Inventors: Stanley C. Ng, Los Altos, CA (US);
Duncan Robert Kerr, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/453,760

(22) Filed: Apr. 23, 2012

(65) Prior Publication Data

US 2012/0206392 A1    Aug. 16, 2012

Related U.S. Application Data

(63) Continuation of application No. 11/394,493, filed on Mar. 31, 2006, now abandoned.

(60) Provisional application No. 60/755,656, filed on Dec. 30, 2005.

(51) Int. Cl.
*G06F 3/041*    (2006.01)

(52) U.S. Cl.
USPC .......................................... 345/173; 345/156

(58) Field of Classification Search
USPC ................................. 345/156–173
See application file for complete search history.

(56) References Cited

U.S. PATENT DOCUMENTS

| | | | |
|---|---|---|---|
| 1,061,578 A | 5/1913 | Wischhusen et al. | |
| 2,063,276 A | 12/1936 | Thomas | |
| 2,798,907 A | 7/1957 | Schneider | |
| 2,903,229 A | 9/1959 | Landge | |
| 2,945,111 A | 7/1960 | McCormick | |
| 3,005,055 A | 10/1961 | Mattke | |
| 3,965,399 A | 6/1976 | Walker et al. | |
| 3,996,441 A | 12/1976 | Ohashi | |
| 4,029,915 A | 6/1977 | Ojima | |
| 4,103,252 A | 7/1978 | Bobick | |
| 4,110,749 A | 8/1978 | Janko et al. | |
| 4,115,670 A | 9/1978 | Chandler | |
| 4,121,204 A | 10/1978 | Welch et al. | |
| 4,129,747 A | 12/1978 | Pepper | |
| 4,158,216 A | 6/1979 | Bigelow | |
| 4,242,676 A | 12/1980 | Piguet et al. | |
| 4,246,452 A | 1/1981 | Chandler | |
| 4,264,903 A | 4/1981 | Bigelow | |
| 4,266,144 A | 5/1981 | Bristol | |
| 4,293,734 A | 10/1981 | Pepper, Jr. | |
| D264,969 S | 6/1982 | McGourty | |

(Continued)

FOREIGN PATENT DOCUMENTS

| | | |
|---|---|---|
| CN | 1139235 | 1/1997 |
| CN | 1455615 | 11/2003 |

(Continued)

OTHER PUBLICATIONS

"About Quicktip®" www.loqicad3d.com/docs/qt.html, downloaded Apr. 8, 2002.

(Continued)

*Primary Examiner* — Viet Pham
(74) *Attorney, Agent, or Firm* — Morrison & Foerster LLP

(57) ABSTRACT

The present invention pertains to improved feedback mechanisms for touch pads. One aspect relates to devices capable of illuminating the touch sensitive surface of the touch pad. Another aspect relates to methods for providing visual feedback at the touch pad.

20 Claims, 19 Drawing Sheets

TRACKING

GESTURING

(56) References Cited

U.S. PATENT DOCUMENTS

| | | |
|---|---|---|
| 4,338,502 A | 7/1982 | Hashimoto et al. |
| 4,380,007 A | 4/1983 | Steinegger |
| 4,380,040 A | 4/1983 | Posset |
| 4,394,649 A | 7/1983 | Suchoff et al. |
| 4,475,008 A | 10/1984 | Doi et al. |
| 4,570,149 A | 2/1986 | Thornburg et al. |
| 4,583,161 A | 4/1986 | Gunderson et al. |
| 4,587,378 A | 5/1986 | Moore |
| 4,604,786 A | 8/1986 | Howie, Jr. |
| 4,613,736 A | 9/1986 | Shichijo et al. |
| 4,644,100 A | 2/1987 | Brenner et al. |
| 4,719,524 A | 1/1988 | Morishima et al. |
| 4,734,034 A | 3/1988 | Maness et al. |
| 4,736,191 A | 4/1988 | Matzke et al. |
| 4,739,191 A | 4/1988 | Puar |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,771,139 A | 9/1988 | DeSmet |
| 4,798,919 A | 1/1989 | Miessler et al. |
| 4,810,992 A | 3/1989 | Eventoff |
| 4,822,957 A | 4/1989 | Talmage, Jr. et al. |
| 4,831,359 A | 5/1989 | Newell |
| 4,849,852 A | 7/1989 | Mullins |
| 4,856,993 A | 8/1989 | Maness et al. |
| 4,860,768 A | 8/1989 | Hon et al. |
| 4,866,602 A | 9/1989 | Hall |
| 4,876,524 A | 10/1989 | Jenkins |
| 4,897,511 A | 1/1990 | Itaya et al. |
| 4,914,624 A | 4/1990 | Dunthorn |
| 4,917,516 A | 4/1990 | Retter |
| 4,943,889 A | 7/1990 | Ohmatoi |
| 4,951,036 A | 8/1990 | Grueter et al. |
| 4,954,823 A | 9/1990 | Binstead |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,086,870 A | 2/1992 | Bolduc |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,192,082 A | 3/1993 | Inoue et al. |
| 5,193,669 A | 3/1993 | Demeo et al. |
| 5,231,326 A | 7/1993 | Echols |
| 5,237,311 A | 8/1993 | Mailey et al. |
| 5,278,362 A | 1/1994 | Ohashi |
| 5,305,017 A | 4/1994 | Gerpheide |
| 5,313,027 A | 5/1994 | Inoue et al. |
| D349,280 S | 8/1994 | Kaneko |
| 5,339,213 A | 8/1994 | O'Callaghan |
| 5,367,199 A | 11/1994 | Lefkowitz et al. |
| 5,374,787 A | 12/1994 | Miller et al. |
| 5,379,057 A | 1/1995 | Clough et al. |
| 5,404,152 A | 4/1995 | Nagai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,432,531 A | 7/1995 | Calder et al. |
| 5,438,331 A | 8/1995 | Gilligan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,494,157 A | 2/1996 | Golenz et al. |
| 5,495,566 A | 2/1996 | Kwatinetz |
| 5,508,703 A | 4/1996 | Okamura et al. |
| 5,508,717 A | 4/1996 | Miller |
| 5,543,588 A | 8/1996 | Bisset et al. |
| 5,543,591 A | 8/1996 | Gillespie et al. |
| 5,555,004 A | 9/1996 | Ono et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,856 A | 12/1996 | Stein et al. |
| 5,589,893 A | 12/1996 | Gaughan et al. |
| 5,596,347 A | 1/1997 | Robertson et al. |
| 5,596,697 A | 1/1997 | Foster et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| 5,648,642 A | 7/1997 | Miller et al. |
| D382,550 S | 8/1997 | Kaneko et al. |
| 5,657,012 A | 8/1997 | Tait |
| 5,661,632 A | 8/1997 | Register |
| D385,542 S | 10/1997 | Kaneko et al. |
| 5,675,362 A | 10/1997 | Clough et al. |
| 5,689,285 A | 11/1997 | Asher |
| 5,721,849 A | 2/1998 | Amro |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,764,066 A | 6/1998 | Novak et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,798,752 A | 8/1998 | Buxton et al. |
| 5,805,144 A | 9/1998 | Scholder et al. |
| 5,808,602 A | 9/1998 | Sellers |
| 5,812,239 A | 9/1998 | Eger |
| 5,812,498 A | 9/1998 | Teres |
| 5,815,141 A | 9/1998 | Phares |
| 5,825,351 A | 10/1998 | Tam |
| 5,825,352 A | 10/1998 | Bisset et al. |
| 5,825,353 A | 10/1998 | Will |
| 5,828,364 A | 10/1998 | Siddiqui |
| 5,838,304 A | 11/1998 | Hall |
| 5,841,078 A | 11/1998 | Miller et al. |
| 5,841,423 A | 11/1998 | Carroll, Jr. et al. |
| D402,281 S | 12/1998 | Ledbetter et al. |
| 5,850,213 A | 12/1998 | Imai et al. |
| 5,856,645 A | 1/1999 | Norton |
| 5,856,822 A | 1/1999 | Du et al. |
| 5,859,629 A | 1/1999 | Tognazzini |
| 5,861,875 A | 1/1999 | Gerpheide |
| 5,869,791 A | 2/1999 | Young |
| 5,875,311 A | 2/1999 | Bertram et al. |
| 5,883,619 A | 3/1999 | Ho et al. |
| 5,889,236 A | 3/1999 | Gillespie et al. |
| 5,889,511 A | 3/1999 | Ong et al. |
| 5,894,117 A | 4/1999 | Kamishima |
| 5,903,229 A | 5/1999 | Kishi |
| 5,907,152 A | 5/1999 | Dandliker et al. |
| 5,907,318 A | 5/1999 | Medina |
| 5,909,211 A | 6/1999 | Combs et al. |
| 5,910,802 A | 6/1999 | Shields et al. |
| 5,914,706 A | 6/1999 | Kono |
| 5,923,388 A | 7/1999 | Kurashima et al. |
| D412,940 S | 8/1999 | Kato et al. |
| 5,933,102 A | 8/1999 | Miller et al. |
| 5,933,141 A | 8/1999 | Smith |
| 5,936,619 A | 8/1999 | Nagasaki et al. |
| 5,943,044 A | 8/1999 | Martinelli et al. |
| 5,953,000 A | 9/1999 | Weirich |
| 5,956,019 A | 9/1999 | Bang et al. |

| | | |
|---|---|---|
| 5,959,610 A | 9/1999 | Silfvast |
| 5,959,611 A | 9/1999 | Smailagic et al. |
| 5,964,661 A | 10/1999 | Dodge |
| 5,973,668 A | 10/1999 | Watanabe |
| 6,000,000 A | 12/1999 | Hawkins et al. |
| 6,002,093 A | 12/1999 | Hrehor et al. |
| 6,002,389 A | 12/1999 | Kasser et al. |
| 6,005,299 A | 12/1999 | Hengst |
| 6,025,832 A | 2/2000 | Sudo et al. |
| 6,031,518 A | 2/2000 | Adams et al. |
| 6,034,672 A | 3/2000 | Gaultier et al. |
| 6,057,829 A | 5/2000 | Silfvast |
| 6,075,533 A | 6/2000 | Chang |
| 6,084,574 A | 7/2000 | Bidiville |
| D430,169 S | 8/2000 | Scibora |
| 6,097,372 A | 8/2000 | Suzuki |
| 6,104,790 A | 8/2000 | Narayanaswami |
| 6,122,526 A | 9/2000 | Parulski et al. |
| 6,124,587 A | 9/2000 | Bidiville et al. |
| 6,128,006 A | 10/2000 | Rosenberg et al. |
| 6,131,048 A | 10/2000 | Sudo et al. |
| 6,141,068 A | 10/2000 | Iijima |
| 6,147,856 A | 11/2000 | Karidis |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| D437,860 S | 2/2001 | Suzuki et al. |
| 6,188,391 B1 | 2/2001 | Seely et al. |
| 6,188,393 B1 | 2/2001 | Shu |
| 6,191,774 B1 | 2/2001 | Schena et al. |
| 6,198,054 B1 | 3/2001 | Janniere |
| 6,198,473 B1 | 3/2001 | Armstrong |
| 6,211,861 B1 | 4/2001 | Rosenberg et al. |
| 6,219,038 B1 | 4/2001 | Cho |
| 6,222,528 B1 | 4/2001 | Gerpheide et al. |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,227,966 B1 | 5/2001 | Yokoi |
| D443,616 S | 6/2001 | Fisher et al. |
| 6,243,078 B1 | 6/2001 | Rosenberg |
| 6,243,080 B1 | 6/2001 | Molne |
| 6,243,646 B1 | 6/2001 | Ozaki et al. |
| 6,248,017 B1 | 6/2001 | Roach |
| 6,254,477 B1 | 7/2001 | Sasaki et al. |
| 6,256,011 B1 | 7/2001 | Culver |
| 6,259,491 B1 | 7/2001 | Ekedahl et al. |
| 6,262,717 B1 | 7/2001 | Donohue et al. |
| 6,262,785 B1 | 7/2001 | Kim |
| 6,266,050 B1 | 7/2001 | Oh et al. |
| 6,285,211 B1 | 9/2001 | Sample et al. |
| D448,810 S | 10/2001 | Goto |
| 6,297,795 B1 | 10/2001 | Kato et al. |
| 6,297,811 B1 | 10/2001 | Kent et al. |
| 6,300,946 B1 | 10/2001 | Lincke et al. |
| 6,307,539 B2 | 10/2001 | Suzuki |
| D450,713 S | 11/2001 | Masamitsu et al. |
| 6,314,483 B1 | 11/2001 | Goto et al. |
| 6,321,441 B1 | 11/2001 | Davidson et al. |
| 6,323,845 B1 | 11/2001 | Robbins |
| D452,250 S | 12/2001 | Chan |
| 6,340,800 B1 | 1/2002 | Zhai et al. |
| D454,568 S | 3/2002 | Andre et al. |
| 6,357,887 B1 | 3/2002 | Novak |
| D455,793 S | 4/2002 | Lin |
| 6,373,265 B1 | 4/2002 | Morimoto et al. |
| 6,373,470 B1 | 4/2002 | Andre et al. |
| 6,377,530 B1 | 4/2002 | Burrows |
| 6,396,523 B1 | 5/2002 | Segal et al. |
| 6,424,338 B1 | 7/2002 | Anderson |
| 6,429,846 B2 | 8/2002 | Rosenberg et al. |
| 6,429,852 B1 | 8/2002 | Adams et al. |
| 6,452,514 B1 | 9/2002 | Philipp |
| 6,465,271 B1 | 10/2002 | Ko et al. |
| 6,473,069 B1 | 10/2002 | Gerpheide |
| 6,476,831 B1 * | 11/2002 | Wirth et al. .................. 715/784 |
| 6,492,602 B2 | 12/2002 | Asai et al. |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Andre et al. |
| D472,245 S | 3/2003 | Andre et al. |
| 6,546,231 B1 | 4/2003 | Someya et al. |
| 6,563,487 B2 | 5/2003 | Martin et al. |
| 6,587,091 B2 | 7/2003 | Serpa |
| 6,606,244 B1 | 8/2003 | Liu et al. |
| 6,618,909 B1 | 9/2003 | Yang |
| 6,636,197 B1 | 10/2003 | Goldenberg et al. |
| 6,639,584 B1 | 10/2003 | Li |
| 6,640,250 B1 | 10/2003 | Chang et al. |
| 6,650,975 B2 | 11/2003 | Ruffner |
| D483,809 S | 12/2003 | Lim |
| 6,658,773 B2 | 12/2003 | Rohne et al. |
| 6,664,951 B1 | 12/2003 | Fujii et al. |
| 6,677,927 B1 | 1/2004 | Bruck et al. |
| 6,678,891 B1 | 1/2004 | Wilcox et al. |
| 6,686,904 B1 | 2/2004 | Sherman et al. |
| 6,686,906 B2 | 2/2004 | Salminen et al. |
| 6,703,550 B2 | 3/2004 | Chu |
| 6,724,817 B1 | 4/2004 | Simpson et al. |
| 6,727,889 B2 | 4/2004 | Shaw |
| D489,731 S | 5/2004 | Huang |
| 6,738,045 B2 | 5/2004 | Hinckley et al. |
| 6,750,803 B2 | 6/2004 | Yates et al. |
| 6,781,576 B2 | 8/2004 | Tamura |
| 6,784,384 B2 | 8/2004 | Park et al. |
| 6,788,288 B2 | 9/2004 | Ano |
| 6,791,533 B2 | 9/2004 | Su |
| 6,795,057 B2 | 9/2004 | Gordon |
| D497,618 S | 10/2004 | Andre et al. |
| 6,810,271 B1 | 10/2004 | Wood et al. |
| 6,822,640 B2 | 11/2004 | Derocher |
| 6,834,975 B2 | 12/2004 | Chu-Chia et al. |
| 6,844,872 B1 | 1/2005 | Farag et al. |
| 6,850,225 B1 * | 2/2005 | Whitcroft .................. 345/168 |
| 6,855,899 B2 | 2/2005 | Sotome |
| 6,865,718 B2 | 3/2005 | Levi Montalcini |
| 6,886,842 B2 | 5/2005 | Vey et al. |
| 6,894,916 B2 | 5/2005 | Reohr et al. |
| D506,476 S | 6/2005 | Andre et al. |
| 6,922,189 B2 | 7/2005 | Fujiyoshi |
| 6,930,494 B2 | 8/2005 | Tesdahl et al. |
| 6,958,614 B2 | 10/2005 | Morimoto |
| 6,977,808 B2 | 12/2005 | Lam et al. |
| 6,978,127 B1 | 12/2005 | Bulthuis et al. |
| 6,985,137 B2 | 1/2006 | Kaikuranta |
| 7,006,077 B1 | 2/2006 | Uusimaki |
| 7,019,225 B2 | 3/2006 | Matsumoto et al. |
| 7,046,230 B2 | 5/2006 | Zadesky et al. |
| 7,050,292 B2 | 5/2006 | Shimura et al. |
| 7,069,044 B2 | 6/2006 | Okada et al. |
| 7,078,633 B2 | 7/2006 | Ihalainen |
| 7,084,856 B2 | 8/2006 | Huppi |
| 7,113,196 B2 | 9/2006 | Kerr |
| 7,117,136 B1 | 10/2006 | Rosedale |
| 7,119,792 B1 | 10/2006 | Andre et al. |
| 7,215,319 B2 | 5/2007 | Kamijo et al. |
| 7,233,318 B2 | 6/2007 | Farag et al. |
| 7,236,154 B1 | 6/2007 | Kerr et al. |
| 7,236,159 B1 | 6/2007 | Siversson |
| 7,253,643 B1 | 8/2007 | Seguine |
| 7,279,647 B2 | 10/2007 | Philipp |
| 7,288,732 B2 | 10/2007 | Hashida |
| 7,297,883 B2 | 11/2007 | Rochon et al. |
| 7,310,089 B2 | 12/2007 | Baker et al. |
| 7,312,785 B2 | 12/2007 | Tsuk et al. |
| 7,321,103 B2 | 1/2008 | Nakanishi et al. |
| 7,333,092 B2 | 2/2008 | Zadesky et al. |
| 7,348,898 B2 | 3/2008 | Ono |
| 7,382,139 B2 | 6/2008 | Mackey |
| 7,394,038 B2 | 7/2008 | Chang |
| 7,395,081 B2 | 7/2008 | Bonnelykke Kristensen et al. |
| 7,397,467 B2 | 7/2008 | Park et al. |
| 7,439,963 B2 | 10/2008 | Geaghan et al. |
| 7,466,307 B2 | 12/2008 | Trent et al. |

| | | |
|---|---|---|
| 7,479,949 B2 | 1/2009 | Jobs et al. |
| 7,486,323 B2 | 2/2009 | Lee et al. |
| 7,502,016 B2 | 3/2009 | Trent, Jr. et al. |
| 7,503,193 B2 | 3/2009 | Schoene et al. |
| 7,593,782 B2 * | 9/2009 | Jobs et al. ............... 700/94 |
| 7,616,097 B1 | 11/2009 | Whang |
| 7,645,955 B2 | 1/2010 | Huang et al. |
| 7,671,837 B2 | 3/2010 | Forsblad et al. |
| 7,708,051 B2 | 5/2010 | Katsumi et al. |
| 7,772,507 B2 | 8/2010 | Orr et al. |
| 2001/0011991 A1 | 8/2001 | Wang et al. |
| 2001/0011993 A1 | 8/2001 | Saarinen |
| 2001/0033270 A1 | 10/2001 | Osawa et al. |
| 2001/0043545 A1 | 11/2001 | Aratani |
| 2001/0050673 A1 | 12/2001 | Davenport |
| 2001/0051046 A1 | 12/2001 | Watanabe et al. |
| 2002/0000978 A1 | 1/2002 | Gerpheide |
| 2002/0011993 A1 | 1/2002 | Lui et al. |
| 2002/0027547 A1 | 3/2002 | Kamijo et al. |
| 2002/0030665 A1 | 3/2002 | Ano |
| 2002/0033848 A1 | 3/2002 | Sciammarella et al. |
| 2002/0039493 A1 | 4/2002 | Tanaka |
| 2002/0045960 A1 | 4/2002 | Phillips et al. |
| 2002/0071550 A1 | 6/2002 | Pletikosa |
| 2002/0089545 A1 | 7/2002 | Levi Montalcini |
| 2002/0103796 A1 | 8/2002 | Hartley |
| 2002/0118131 A1 | 8/2002 | Yates et al. |
| 2002/0118169 A1 | 8/2002 | Hinckley et al. |
| 2002/0145594 A1 | 10/2002 | Derocher |
| 2002/0154090 A1 | 10/2002 | Lin |
| 2002/0158844 A1 | 10/2002 | McLoone et al. |
| 2002/0164156 A1 | 11/2002 | Bilbrey |
| 2002/0168947 A1 | 11/2002 | Lemley |
| 2002/0180701 A1 | 12/2002 | Hayama et al. |
| 2002/0196239 A1 | 12/2002 | Lee |
| 2003/0002246 A1 | 1/2003 | Kerr |
| 2003/0016211 A1 * | 1/2003 | Woolley ............... 345/173 |
| 2003/0025679 A1 | 2/2003 | Taylor et al. |
| 2003/0028346 A1 | 2/2003 | Sinclair et al. |
| 2003/0043121 A1 | 3/2003 | Chen |
| 2003/0043174 A1 | 3/2003 | Hinckley et al. |
| 2003/0050092 A1 | 3/2003 | Yun |
| 2003/0076301 A1 | 4/2003 | Tsuk et al. |
| 2003/0076303 A1 | 4/2003 | Huppi |
| 2003/0091377 A1 | 5/2003 | Hsu et al. |
| 2003/0095095 A1 | 5/2003 | Pihlaja |
| 2003/0095096 A1 | 5/2003 | Robbin et al. |
| 2003/0098851 A1 | 5/2003 | Brink |
| 2003/0103043 A1 | 6/2003 | Mulligan et al. |
| 2003/0117367 A1 * | 6/2003 | Yan ............... 345/156 |
| 2003/0122792 A1 | 7/2003 | Yamamoto et al. |
| 2003/0135292 A1 | 7/2003 | Husgafvel et al. |
| 2003/0142081 A1 | 7/2003 | Iizuka et al. |
| 2003/0184517 A1 | 10/2003 | Senzui et al. |
| 2003/0197740 A1 | 10/2003 | Reponen |
| 2003/0206202 A1 | 11/2003 | Moriya |
| 2003/0210537 A1 | 11/2003 | Engelmann |
| 2003/0224831 A1 | 12/2003 | Engstrom et al. |
| 2004/0027341 A1 | 2/2004 | Derocher |
| 2004/0074756 A1 | 4/2004 | Kawakami et al. |
| 2004/0080682 A1 | 4/2004 | Dalton |
| 2004/0109357 A1 | 6/2004 | Cernea et al. |
| 2004/0150619 A1 | 8/2004 | Baudisch et al. |
| 2004/0156192 A1 | 8/2004 | Kerr et al. |
| 2004/0178997 A1 | 9/2004 | Gillespie et al. |
| 2004/0200699 A1 | 10/2004 | Matsumoto et al. |
| 2004/0215986 A1 | 10/2004 | Shakkarwar |
| 2004/0224638 A1 | 11/2004 | Fadell et al. |
| 2004/0239622 A1 | 12/2004 | Proctor et al. |
| 2004/0252109 A1 | 12/2004 | Trent, Jr. et al. |
| 2004/0252867 A1 | 12/2004 | Lan et al. |
| 2004/0253989 A1 | 12/2004 | Tupler et al. |
| 2004/0263388 A1 | 12/2004 | Krumm et al. |
| 2004/0267874 A1 | 12/2004 | Westberg et al. |
| 2005/0012644 A1 | 1/2005 | Hurst et al. |
| 2005/0017957 A1 | 1/2005 | Yi |
| 2005/0024341 A1 | 2/2005 | Gillespie et al. |
| 2005/0030048 A1 | 2/2005 | Bolender |
| 2005/0052425 A1 | 3/2005 | Zadesky et al. |
| 2005/0052426 A1 | 3/2005 | Hagermoser et al. |
| 2005/0052429 A1 | 3/2005 | Philipp |
| 2005/0068304 A1 | 3/2005 | Lewis et al. |
| 2005/0083299 A1 | 4/2005 | Nagasaka |
| 2005/0083307 A1 | 4/2005 | Aufderheide |
| 2005/0090288 A1 | 4/2005 | Stohr et al. |
| 2005/0104867 A1 * | 5/2005 | Westerman et al. ......... 345/173 |
| 2005/0110768 A1 | 5/2005 | Marriott et al. |
| 2005/0129199 A1 | 6/2005 | Abe |
| 2005/0139460 A1 | 6/2005 | Hosaka |
| 2005/0140657 A1 | 6/2005 | Park et al. |
| 2005/0143124 A1 | 6/2005 | Kennedy et al. |
| 2005/0156881 A1 | 7/2005 | Trent et al. |
| 2005/0162402 A1 * | 7/2005 | Watanachote ............... 345/173 |
| 2005/0183035 A1 * | 8/2005 | Ringel et al. ............... 715/811 |
| 2005/0204309 A1 | 9/2005 | Szeto |
| 2005/0237308 A1 | 10/2005 | Autio et al. |
| 2006/0026521 A1 | 2/2006 | Hotelling et al. |
| 2006/0032680 A1 | 2/2006 | Elias et al. |
| 2006/0034042 A1 | 2/2006 | Hisano et al. |
| 2006/0038791 A1 | 2/2006 | Mackey |
| 2006/0095848 A1 | 5/2006 | Naik |
| 2006/0097991 A1 | 5/2006 | Hotelling et al. |
| 2006/0131156 A1 | 6/2006 | Voelckers |
| 2006/0143574 A1 | 6/2006 | Ito et al. |
| 2006/0174568 A1 | 8/2006 | Kinoshita et al. |
| 2006/0181517 A1 | 8/2006 | Zadesky et al. |
| 2006/0197750 A1 | 9/2006 | Kerr et al. |
| 2006/0232557 A1 | 10/2006 | Fallot-Burghardt |
| 2006/0236262 A1 * | 10/2006 | Bathiche et al. ............... 715/786 |
| 2006/0250377 A1 | 11/2006 | Zadesky et al. |
| 2006/0274042 A1 | 12/2006 | Krah et al. |
| 2006/0274905 A1 | 12/2006 | Lindahl et al. |
| 2006/0279896 A1 | 12/2006 | Bruwer |
| 2006/0284836 A1 | 12/2006 | Philipp |
| 2007/0013671 A1 | 1/2007 | Zadesky et al. |
| 2007/0018970 A1 | 1/2007 | Tabasso et al. |
| 2007/0052044 A1 | 3/2007 | Forsblad et al. |
| 2007/0052691 A1 | 3/2007 | Zadesky et al. |
| 2007/0080936 A1 | 4/2007 | Tsuk et al. |
| 2007/0080938 A1 | 4/2007 | Robbin et al. |
| 2007/0080952 A1 | 4/2007 | Lynch et al. |
| 2007/0083822 A1 | 4/2007 | Robbin et al. |
| 2007/0085841 A1 | 4/2007 | Tsuk et al. |
| 2007/0097086 A1 | 5/2007 | Battles et al. |
| 2007/0120834 A1 | 5/2007 | Boillot |
| 2007/0126696 A1 | 6/2007 | Boillot |
| 2007/0152975 A1 | 7/2007 | Ogihara |
| 2007/0152977 A1 | 7/2007 | Ng et al. |
| 2007/0152983 A1 | 7/2007 | McKillop et al. |
| 2007/0155434 A1 | 7/2007 | Jobs et al. |
| 2007/0157089 A1 | 7/2007 | Van Os et al. |
| 2007/0242057 A1 | 10/2007 | Zadesky et al. |
| 2007/0247421 A1 | 10/2007 | Orsley et al. |
| 2007/0247443 A1 | 10/2007 | Philipp |
| 2007/0271516 A1 | 11/2007 | Carmichael |
| 2007/0273671 A1 | 11/2007 | Zadesky et al. |
| 2007/0276525 A1 | 11/2007 | Zadesky et al. |
| 2007/0279394 A1 | 12/2007 | Lampell |
| 2007/0285404 A1 | 12/2007 | Rimon et al. |
| 2007/0290990 A1 | 12/2007 | Robbin et al. |
| 2007/0291016 A1 | 12/2007 | Philipp |
| 2007/0296709 A1 | 12/2007 | GuangHai |
| 2008/0006453 A1 | 1/2008 | Hotelling et al. |
| 2008/0006454 A1 | 1/2008 | Hotelling |
| 2008/0007533 A1 | 1/2008 | Hotelling et al. |
| 2008/0007539 A1 | 1/2008 | Hotelling et al. |
| 2008/0012837 A1 | 1/2008 | Marriott et al. |
| 2008/0018615 A1 | 1/2008 | Zadesky et al. |
| 2008/0018616 A1 | 1/2008 | Lampell et al. |
| 2008/0018617 A1 | 1/2008 | Ng et al. |
| 2008/0036473 A1 | 2/2008 | Jansson |
| 2008/0036734 A1 | 2/2008 | Forsblad et al. |
| 2008/0060925 A1 | 3/2008 | Weber et al. |
| 2008/0069412 A1 | 3/2008 | Champagne et al. |
| 2008/0079699 A1 | 4/2008 | Mackey |
| 2008/0087476 A1 | 4/2008 | Prest |
| 2008/0088582 A1 | 4/2008 | Prest |
| 2008/0088596 A1 | 4/2008 | Prest |

| | | | | | | |
|---|---|---|---|---|---|---|
| 2008/0088597 | A1 | 4/2008 | Prest | GB | 2015167 | 9/1979 |
| 2008/0088600 | A1 | 4/2008 | Prest | GB | 2072389 | 9/1981 |
| 2008/0094352 | A1 | 4/2008 | Tsuk et al. | GB | 2315186 | 1/1998 |
| 2008/0098330 | A1 | 4/2008 | Tsuk et al. | GB | 2333215 | 7/1999 |
| 2008/0110739 | A1 | 5/2008 | Peng et al. | GB | 2391060 | 1/2004 |
| 2008/0111795 | A1 | 5/2008 | Bollinger | GB | 2402105 | 12/2004 |
| 2008/0143681 | A1 | 6/2008 | XiaoPing | JP | 57-95722 | 6/1982 |
| 2008/0165158 | A1 | 7/2008 | Hotelling et al. | JP | 57-97626 | 6/1982 |
| 2008/0196945 | A1 | 8/2008 | Konstas | JP | 61-117619 | 6/1986 |
| 2008/0202824 | A1 | 8/2008 | Philipp et al. | JP | 61-124009 | 6/1986 |
| 2008/0209442 | A1 | 8/2008 | Setlur et al. | JP | 63-20411 | 1/1988 |
| 2008/0264767 | A1 | 10/2008 | Chen et al. | JP | 63-106826 | 5/1988 |
| 2008/0280651 | A1 | 11/2008 | Duarte | JP | 63-181022 | 7/1988 |
| 2008/0284742 | A1 | 11/2008 | Prest | JP | 63-298518 | 12/1988 |
| 2008/0293274 | A1 | 11/2008 | Milan | JP | 03-57617 | 6/1991 |
| 2009/0021267 | A1 | 1/2009 | Golovchenko et al. | JP | 3-192418 | 8/1991 |
| 2009/0026558 | A1 | 1/2009 | Bauer et al. | JP | 4-32920 | 2/1992 |
| 2009/0033635 | A1 | 2/2009 | Wai | JP | 4-205408 | 7/1992 |
| 2009/0036176 | A1 | 2/2009 | Ure | JP | 5-041135 | 2/1993 |
| 2009/0058687 | A1 | 3/2009 | Rothkopf et al. | JP | 5-080938 | 4/1993 |
| 2009/0058801 | A1 | 3/2009 | Bull | JP | 5-101741 | 4/1993 |
| 2009/0058802 | A1 | 3/2009 | Orsley et al. | JP | 5-36623 | 5/1993 |
| 2009/0073130 | A1 | 3/2009 | Weber et al. | JP | 5-189110 | 7/1993 |
| 2009/0078551 | A1 | 3/2009 | Kang | JP | 5-205565 | 8/1993 |
| 2009/0109181 | A1 | 4/2009 | Hui et al. | JP | 5-211021 | 8/1993 |
| 2009/0141046 | A1 | 6/2009 | Rathnam et al. | JP | 5-217464 | 8/1993 |
| 2009/0160771 | A1 | 6/2009 | Hinckley et al. | JP | 5-233141 | 9/1993 |
| 2009/0179854 | A1 | 7/2009 | Weber et al. | JP | 5-262276 | 10/1993 |
| 2009/0197059 | A1 | 8/2009 | Weber et al. | JP | 5-265656 | 10/1993 |
| 2009/0229892 | A1 | 9/2009 | Fisher et al. | JP | 5-274956 | 10/1993 |
| 2009/0273573 | A1 | 11/2009 | Hotelling | JP | 5-289811 | 11/1993 |
| 2010/0058251 | A1 | 3/2010 | Rottler et al. | JP | 5-298955 | 11/1993 |
| 2010/0060568 | A1 | 3/2010 | Fisher et al. | JP | 5-325723 | 12/1993 |
| 2010/0073319 | A1 | 3/2010 | Lyon et al. | JP | 6-20570 | 1/1994 |
| 2010/0149127 | A1 | 6/2010 | Fisher et al. | JP | 6-084428 | 3/1994 |
| 2010/0289759 | A1 | 11/2010 | Fisher et al. | JP | 6-089636 | 3/1994 |
| 2010/0313409 | A1 | 12/2010 | Weber et al. | JP | 6-96639 | 4/1994 |
| 2011/0005845 | A1 | 1/2011 | Hotelling et al. | JP | 6-111695 | 4/1994 |
| | | | | JP | 6-139879 | 5/1994 |

FOREIGN PATENT DOCUMENTS

| | | | | | |
|---|---|---|---|---|---|
| JP | 6-187078 | 7/1994 | | | |
| CN | 1499356 | 5/2004 | JP | 6-208433 | 7/1994 |
| CN | 1659506 | 8/2005 | JP | 6-267382 | 9/1994 |
| DE | 3615742 | 11/1987 | JP | 6-283993 | 10/1994 |
| DE | 19722636 | 12/1998 | JP | 6-333459 | 12/1994 |
| DE | 10022537 | 11/2000 | JP | 7-107574 | 4/1995 |
| DE | 20019074 | 2/2001 | JP | 7-41882 | 7/1995 |
| DE | 10 2004 043 | 4/2006 | JP | 7-201249 | 8/1995 |
| EP | 0178157 | 4/1986 | JP | 7-201256 | 8/1995 |
| EP | 0419145 | 3/1991 | JP | 7-253838 | 10/1995 |
| EP | 0 498 540 | 8/1992 | JP | 7-261899 | 10/1995 |
| EP | 0 521 683 | 1/1993 | JP | 7-261922 | 10/1995 |
| EP | 0 674 288 | 9/1995 | JP | 7-296670 | 11/1995 |
| EP | 0 731 407 | 9/1996 | JP | 7-319001 | 12/1995 |
| EP | 0 551 778 | 1/1997 | JP | 8-016292 | 1/1996 |
| EP | 0 880 091 | 11/1998 | JP | 8-115158 | 5/1996 |
| EP | 1 026 713 | 8/2000 | JP | 8-203387 | 8/1996 |
| EP | 1 081 922 | 3/2001 | JP | 8-293226 | 11/1996 |
| EP | 1 098 241 | 5/2001 | JP | 8-298045 | 11/1996 |
| EP | 1 133 057 | 9/2001 | JP | 8-299541 | 11/1996 |
| EP | 1 162 826 | 12/2001 | JP | 8-316664 | 11/1996 |
| EP | 1 168 396 | 1/2002 | JP | 9-044289 | 2/1997 |
| EP | 1 205 836 | 5/2002 | JP | 9-069023 | 3/1997 |
| EP | 1 244 053 | 9/2002 | JP | 9-128148 | 5/1997 |
| EP | 1 251 455 | 10/2002 | JP | 9-134248 | 5/1997 |
| EP | 1 263 193 | 12/2002 | JP | 9-218747 | 8/1997 |
| EP | 1 347 481 | 9/2003 | JP | 9-230993 | 9/1997 |
| EP | 1 376 326 | 1/2004 | JP | 9-231858 | 9/1997 |
| EP | 1 467 392 | 10/2004 | JP | 9-233161 | 9/1997 |
| EP | 1 482 401 | 12/2004 | JP | 9-251347 | 9/1997 |
| EP | 1 496 467 | 1/2005 | JP | 9-258895 | 10/1997 |
| EP | 1 517 228 | 3/2005 | JP | 9-288926 | 11/1997 |
| EP | 1 542 437 | 6/2005 | JP | 9-512979 | 12/1997 |
| EP | 1 589 407 | 10/2005 | JP | 10-63467 | 3/1998 |
| EP | 1 610 210 | 12/2005 | JP | 10-74127 | 3/1998 |
| EP | 1 784 058 | 5/2007 | JP | 10-074429 | 3/1998 |
| EP | 1 841 188 | 10/2007 | JP | 10-198507 | 7/1998 |
| EP | 1 850 218 | 10/2007 | JP | 10-227878 | 8/1998 |
| EP | 1 876 711 | 1/2008 | JP | 10-240693 | 9/1998 |
| FR | 2 686 440 | 7/1993 | JP | 10-320322 | 12/1998 |

| | | |
|---|---|---|
| JP | 10-326149 | 12/1998 |
| JP | 11-24834 | 1/1999 |
| JP | 11-184607 | 7/1999 |
| JP | 11-194863 | 7/1999 |
| JP | 11-194872 | 7/1999 |
| JP | 11-194882 | 7/1999 |
| JP | 11-194883 | 7/1999 |
| JP | 11-194891 | 7/1999 |
| JP | 11-195353 | 7/1999 |
| JP | 11-203045 | 7/1999 |
| JP | 11-212725 | 8/1999 |
| JP | 11-272378 | 10/1999 |
| JP | 11-338628 | 12/1999 |
| JP | 2000-200147 | 7/2000 |
| JP | 2000-215549 | 8/2000 |
| JP | 2000-267777 | 9/2000 |
| JP | 2000-267786 | 9/2000 |
| JP | 2000-267797 | 9/2000 |
| JP | 2000-353045 | 12/2000 |
| JP | 2001-11769 | 1/2001 |
| JP | 2001-22508 | 1/2001 |
| JP | 2001-184158 | 7/2001 |
| JP | 3085481 | 2/2002 |
| JP | 2002-215311 | 8/2002 |
| JP | 2003-015796 | 1/2003 |
| JP | 2003-060754 | 2/2003 |
| JP | 2003-099198 | 4/2003 |
| JP | 2003-150303 | 5/2003 |
| JP | 2003-517674 | 5/2003 |
| JP | 2003-280799 | 10/2003 |
| JP | 2003-280807 | 10/2003 |
| JP | 2004-362097 | 12/2004 |
| JP | 2005-251218 | 9/2005 |
| JP | 2005-285140 | 10/2005 |
| JP | 2005-293606 | 10/2005 |
| JP | 2006-004453 | 1/2006 |
| JP | 2006-178962 | 7/2006 |
| JP | 3852854 | 12/2006 |
| JP | 2007-123473 | 5/2007 |
| KR | 1998-71394 | 10/1998 |
| KR | 1999-50198 | 7/1999 |
| KR | 2000-0008579 | 2/2000 |
| KR | 2001-0052016 | 6/2001 |
| KR | 2001-108361 | 12/2001 |
| KR | 2002-65059 | 8/2002 |
| KR | 10-2006-0021678 | 3/2006 |
| TW | 431607 | 4/2001 |
| TW | 00470193 | 12/2001 |
| TW | 547716 | 8/2003 |
| TW | 1220491 | 8/2004 |
| WO | WO-94/17494 | 8/1994 |
| WO | WO-95/00897 | 1/1995 |
| WO | WO-96/27968 | 9/1996 |
| WO | WO-98/14863 | 4/1998 |
| WO | WO-99/49443 | 9/1999 |
| WO | WO-00/79772 | 12/2000 |
| WO | WO-01/02949 | 1/2001 |
| WO | WO-01/44912 | 6/2001 |
| WO | WO-02/08881 | 1/2002 |
| WO | WO-03/025960 | 3/2003 |
| WO | WO-03/044645 | 5/2003 |
| WO | WO-03/044956 | 5/2003 |
| WO | WO-03/088176 | 10/2003 |
| WO | WO-03/090008 | 10/2003 |
| WO | WO-2004/001573 | 12/2003 |
| WO | WO-2004/040606 | 5/2004 |
| WO | WO-2004/091956 | 10/2004 |
| WO | WO-2005/055620 | 6/2005 |
| WO | WO-2005/076117 | 8/2005 |
| WO | WO-2005/114369 | 12/2005 |
| WO | WO-2005/124526 | 12/2005 |
| WO | WO-2006/020305 | 2/2006 |
| WO | WO-2006/021211 | 3/2006 |
| WO | WO-2006/037545 | 4/2006 |
| WO | WO 2006/104745 | 10/2006 |
| WO | WO-2006/135127 | 12/2006 |
| WO | WO-2007/025858 | 3/2007 |
| WO | WO-2007/078477 | 7/2007 |
| WO | WO-2007/084467 | 7/2007 |
| WO | WO-2007/089766 | 8/2007 |
| WO | WO-2008/007372 | 1/2008 |
| WO | WO-2008/045414 | 4/2008 |
| WO | WO-2008/045833 | 4/2008 |

OTHER PUBLICATIONS

Ahl, David, "Controller Update," Creative Computing vo. 9, No. 12, Dec. 1983.

Ahmad, "A Usable Real-Time 3D Hand Tracker," Proceedings of the 28th Asilomar Conference on Signals, Systems and Computers—Part 2 (of 2) vol. 2 (Oct 1994).

"Alps Electric introduces the GlidePoint Wave Keyboard; combines a gently curved design with Alps' advanced GlidePoint Technology," Business Wire (Oct. 21, 1996).

"Alps Electric Ships GlidePoint Keyboard for the Macintosh; Includes a GlidePoint Touchpad, Erase-Eaze Backspace Key and Contoured Wrist Rest," Business Wire (Jul. 1, 1996).

Apple Presents iPod: Ultra-Portable MP3 Music Player Puts 1,000 Songs in Your Pocket, retreived from htto://www.apple.com/pr/library/2001/oct/23ipod.html on Oct. 23, 2001.

"Apple Unveils Optical Mouse and New Pro Keyboard," Press Release, Jul. 19, 2000.

"APS show guide to exhibitors," Physics Today 49(3) (Mar. 1996).

"Atari VCS/2600 Peripherals," www.classicgaming.com/gamingmuseum/2006p.html, downloaded Feb. 28, 2007, pp. 1-15.

Baig, E.C., "Your PC Just Might Need a Mouse," U.S. News & World Report 108(22) (Jun. 4, 1990).

Bang & Olufsen Telecom a/s. (2000). BeoCom 6000 User Guide; 53 pages.

Bartimo, Jim, "The Portables: Travelling Quickly," Computerworld (Nov. 14, 1983).

Boling, Douglas (1993) "Programming Microsoft Windows CE.NET," p. 109.

Bray, "Phosphors help switch on xenon," Physics in Action, pp. 1-3, Apr. 1999.

Brink et al., "Pumped-up portables," U.S. News & World Report 116(21) (May 30, 1994).

Brown et al., "Windows on Tablets as a Means of Achieving Virtual Input Devices," Human-Computer Interaction—INTERACT '90 (1990).

Buxton et al., "Issues and Techniques in Touch-Sensitive Tablet Input," Computer Graphics 19(3), Proceedings of SIGGRAPH '85 (1985).

Chapweske, Adam "PS/2 Mouse/Keyboard Protocol," 1999, http://panda.cs.ndsu.nodak.edu/~achapwes/PICmicro/PS2/ps2.htm.

Chen et al., "A Study in Interactive 3-D Rotation Using 2-D Control Devices," Computer Graphics 22(4) (Aug. 1988).

De Meyer, Kevin, "Crystal Optical Mouse," Feb. 14, 2002, Heatseekerz, Web Article 19.

"Der Klangmeister," Connect Magazine, Aug. 1998.

"Design News literature plus," Design News 51(24) (Dec. 18, 1995).

"Diamond Multimedia Announces Rio PMP300 Portable MP3 Music Player," located at http://news.harmony-central.com/Newp/1998/Rio-PMP300.html visited on May 5, 2008. (4 pages).

Evans et al., "Tablet-based Valuators that Provide One, Two, or Three Degrees of Freedom," Computer Grahics 15(3) (Aug. 1981).

Evb Elektronik "TSOP6238 IR Receiver Modules for Infrared Remote Control Systems" dated Jan. 2004 1 page.

Fiore, "Zen Touchpad," Cornell University, May 2000.

Gadgetboy, "Point and click with the latest mice," CNET Asia Product Review, www.asia.cnet.com/reviews . . .are/qadgetboy/0,39001770,380235900,00.htm, downloaded Dec. 5, 2001.

Gfroerer, "Photoluminescence in Analysis of Surfaces and Interfaces," Encyclopedia of Analytical Chemistry, pp. 1-23, Copyright John Wiley & Sons Ltd, Chichester, 2000.

Interlink Electronics, VersaPad: Integration Guide, ©1998 (VersaPad), pp. 1-35.

Jesitus, John, "Broken promies?", Industry Week/IW 246(20) (Nov. 3, 1997).

Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).

Kobayashi et al. (1994) "Development of the Touch Switches with the Click Response," Koukuu Denshi Gihou No. 17, pp. 44-48 (published by the Japan Aviation Electronics Industry, Ltd.).

Kobayashi et al. (1997) "Dynamic Soundscape: Mapping Time to Space for Audio Browsing," Computer Human Interaction: 16 pages.

Letter re: Bang & Olufsen a/s by David Safran, Nixon Peabody, LLP, May 21, 2004, with BeoCom 6000 Sales Training Brochure, 7 pages.

Luna Technologies International, Inc., LUNA Photoluminescent Safety Products, "Photoluminescence-What is Photoluminescence?" from website at http://www.lunaplast.com/photoluminescence.com on Dec. 27, 2005.

"Manufactures," Laser Focus World, Buyers Guide '96, 31(12) (Dec. 1995).

Mims, Forrest M., III, "A Few Quick Pointers; Mouses, Touch Screens, Touch Pads, Light Pads, and the Like Can Make System Easier to Use," Computers & Electronics (22) (May 1984).

Nass, Richard, "Touchpad input device goes digital to give portable systems a desktop 'mouse-like' feel," Electronic Design 44(18) (Sep. 3, 1996).

"National Design Engineering Show," Design News 52(5) (Mar. 4, 1996).

"Neuros MP3 Digital Audio Computer," www.neurosaudio.com, downloaded Apr. 9, 2003.

"OEM Touchpad Modules" website www.glidepoint.com/sales/modules.index.shtml, downloaded Feb. 13, 2002.

Perenson, Melissa, "New & Improved: Touchpad Redux," PC Magazine (Septmber 10, 1996).

Petersen, Marty, "Koala Pad Touch Tablet & Micro Illustrator Software," InfoWorld (Oct. 10, 1983).

Petruzzellis, "Force-Sensing Resistors," Electronics Now 64(3) (Mar. 1993).

Photographs of Innovation 2000 Best of Show Award Presented at the 2000 Intl CES Innovations Design & Engineering Showcase, Jan. 6, 2000, 1 page.

"Preview of exhibitor booths at the Philadelphia show," Air Conditioning, Heating & News 200(2) (Jan. 13, 1997).

"Preview of exhibitor booths at the Philadelphia show, " Air Conditioning, Heating & News 200(2) (Jan. 13,1997).

"Product news," Design News 53(11) (Jun. 9, 1997).

"Product news," Design News 53(9) (May 5, 1997).

"Product Overview—ErgoCommander®," www.logicad3d.com/products/ErgoCommander.htm, downloaded Apr. 8, 2002.

"Product Overview—SpaceMouse® Classic," www.logicad3d.com/products/Classic.htm, downloaded Apr. 8, 2002.

SanDisk Sansa Connect User Guide, 2007; 29 pages.

Soderholm, Lars G., Sensing Systems for 'Touch and Feel,' Design News (May 8, 1989): pp. 72-76.

Sony presents "Choice Without Compromise" at IBC '97 M2 Presswire (Jul. 24, 1997).

Spiwak, Marc, "A Great New Wireless Keyboard," Popular Electronics 14(12) (Dec. 1997).

Spiwak, Marc, "A Pair of Unusual Controllers," Popular Electronics 14(4) (Apr. 1997).

Sylvania, "Intellvision™ Intelligent Television Master Component Service Manual," pp. 1, 2 and 8, 1979.

"Synaptics Tough Pad Interfacing Guide," Second Edition, Mar. 25, 1998, Synaptics, Inc., San Jose, CA, pp. 1-90.

"System Service and Troubleshooting Manual," www.dsplib.com/intv/Master,.

Tessler, Franklin, "Point Pad," Macworld 12(10) (Oct. 1995).

Tessler, Franklin, "Smart Input: How to Chose from the New Generation of Innovative Input Devices," Macworld 13(5) (May 1996).

Tessler, Franklin, "Touchpads," Macworld 13(2) (Feb. 1996).

Translation of Trekstor's Defense Statement to the District Court Mannheim of May 23, 2008; 37 pages.

"Triax Custom Controllers due; Video Game Controllers," HFD-The Weekly Home Furnishing Newspaper 67(1) (Jan. 4, 1993).

Tsuk et al., U.S. Office Action mailed Sep. 30, 2004, directed to U.S. Appl. No. 10/256,716; 11 pages.

"Touchpad," Notebook PC Manual, Acer Information Co. Ltd., Feb. 16, 2005, pp. 11-12.

Tsuk et al., U.S. Office Action mailed Jun. 24, 2005, directed to U.S. Appl. No. 10/256,716; 12 pages.

Tsuk et al., U.S. Office Action mailed Jan. 10, 2006, directed to U.S. Appl. No. 10/256,716; 12 pages.

Tsuk et al., U.S. Office Action mailed Aug. 3, 2006, directed to U.S. Appl. No. 10/256,716; 15 pages.

Tsuk et al., U.S. Office Action mailed Oct. 13, 2006, directed to U.S. Appl. No. 10/256,716; 16 pages.

Tsuk et al., U.S. Office Action mailed Aug. 7, 2009, directed to U.S. Appl. No. 11/610,181; 20 pages.

Tsuk et al., U.S. Office Action mailed Jul. 7, 2009, directed to U.S. Appl. No. 11/610,190; 24 pages.

Tsuk et al., U.S. Office Action mailed Dec. 31, 2009, directed to U.S. Appl. No. 11/610,190; 25 pages.

Tsuk et al., U.S. Office Action mailed Apr. 28, 2010, directed to U.S. Appl. No. 11/610,190; 29 pages.

Tsuk et al., U.S. Office Action mailed Aug. 6, 2010, directed to U.S. Appl. No. 11/610,190; 30 pages.

Tsuk et al., U.S. Office Action mailed Apr. 19, 2011, directed to U.S. Appl. No. 11/610,190; 25 pages.

Tsuk et al., U.S. Office Action mailed Nov. 1, 2010, directed to U.S. Appl. No. 11/959,918; 8 pages.

Tsuk et al., U.S. Office Action mailed Mar. 31, 2011, directed to U.S. Appl. No. 11/959,918; 9 pages.

Tsuk et al., U.S. Office Action mailed Oct. 26, 2010, directed to U.S. Appl. No. 11/959,942; 27 pages.

Robbin et al., U.S. Office Action mailed Sep. 30, 2004, directed to U.S. Appl. No. 10/259,159; 14 pages.

Robbin et al., U.S. Office Action mailed Jun. 16, 2005, directed to U.S. Appl. No. 10/259,159; 16 pages.

Robbin et al., U.S. Office Action mailed Jan. 11, 2006, directed to U.S. Appl. No. 10/259,159; 15 pages.

Robbin et al., U.S. Office Action mailed Aug. 3, 2006, directed to U.S. Appl. No. 10/259,159; 15 pages.

Robbin et al., U.S. Office Action mailed Oct. 13, 2006, directed to U.S. Appl. No. 10/259,159; 18 pages.

Robbin et al., U.S. Office Action mailed Jan. 18, 2007, directed to U.S. Appl. No. 10/259,159; 18 pages.

Robbin et al., U.S. Office Action mailed Aug. 10, 2009, directed to U.S. Appl. No. 11/610,376; 11 pages.

Robbin et al., U.S. Office Action mailed Aug. 12, 2009, directed to U.S. Appl. No. 11/610,384; 20 pages.

Robbin et al., U.S. Office Action mailed Oct. 29, 2010, directed to U.S. Appl. No. 11/838,845; 8 pages.

Robbin et al., U.S. Office Action mailed Apr. 26, 2011, directed to U.S. Appl. No. 11/838,845; 9 pages.

Zadesky et al., U.S. Office Action mailed Oct. 27, 2006, directed to U.S. Appl. No. 10/643,256; 14 pages.

Zadesky et al., U.S. Office Action mailed Mar. 23, 2007, directed to U.S. Appl. No. 10/643,256; 11 pages.

Zadesky et al., U.S. Office Action mailed Jul. 13, 2007, directed to U.S. Appl. No. 10/643,256; 13 pages.

Zadesky et al., U.S. Office Action mailed Dec. 12, 2007, directed to U.S. Appl. No. 10/643,256; 12 pages.

Zadesky et al., U.S. Office Action mailed Jul. 9, 2008, directed to U.S. Appl. No. 10/643,256; 12 pages.

Zadesky et al., U.S. Office Action mailed Mar. 30, 2010, directed to U.S. Appl. No. 11/592,679; 13 pages.

Zadesky et al., U.S. Office Action mailed Mar. 31, 2011, directed to U.S. Appl. No. 11/882,005; 7 pages.

Ng et al., U.S. Office Action mailed Jan. 14, 2010, directed to U.S. Appl. No. 11/394,493; 20 pages.

Ng et al., U.S. Office Action mailed Jun. 22, 2010, directed to U.S. Appl. No. 11/394,493; 14 pages.

Ng et al., U.S. Office Action mailed Jan. 15, 2010, directed to U.S. Application No. 11/882,423; 22 pages.

Ng et al., U.S. Office Action mailed Dec. 9, 2010, directed to U.S. Appl. No. 11/394,493; 13 pages.

Ng et al., U.S. Office Action mailed Jul. 8, 2010, directed to U.S. Appl. No. 11/882,423; 19 pages.

Ng et al., U.S. Office Action mailed Oct. 26, 2010, directed to U.S. Appl. No. 11/882,423; 18 pages.

Ng et al., U.S. Office Action mailed May 11, 2011, directed to U.S. Appl. No. 11/882,423; 20 pages.
Ng et al., U.S. Office Action mailed Jun. 21, 2011, directed to U.S. Appl. No. 11/394,493; 18 pages.
Ng et al., U.S. Office Action mailed Oct. 27, 2011, directed to U.S. Appl. No. 11/882,423; 24 pages.
Forsblad et al., U.S. Office Action mailed Jan. 26, 2009, directed to U.S. Appl. No. 11/355,022; 15 pages.
Forsblad et al., U.S. Office Action mailed Jun. 25, 2009, directed to U.S. Appl. No. 11/355,022; 18 pages.
Forsblad et al., U.S. Office Action mailed Jan. 27, 2009, directed to U.S. Appl. No. 11/882,421; 15 pages.
Lampell, U.S. Office Action mailed Sep. 15, 2009, directed to U.S. Appl. No. 11/530,807; 15 pages.
Lampell, U.S. Office Action mailed Jun. 4, 2010, directed to U.S. Appl. No. 11/530,807; 15 pages.
Lampell, U.S. Office Action mailed Dec. 3, 2010, directed to U.S. Appl. No. 11/530,807; 17 pages.
Lampell et al., U.S. Office Action mailed Dec. 22, 2010, directed to U.S. Appl. No. 11/882,427; 16 pages.
Zadesky et al., U.S. Office Action mailed Nov. 20, 2007, directed to U.S. Appl. No. 11/057,050; 33 pages.
Zadesky et al, U.S. Office Action mailed Aug. 19, 2008, directed to U.S. Appl. No. 11/057,050; 23 pages.
Zadesky et al., U.S. Office Action mailed Nov. 26, 2008, directed to U.S. Appl. No. 11/057,050; 25 pages.
Zadesky et al., U.S. Office Action mailed Dec. 24, 2008, directed to U.S. Appl. No. 11/057,050; 25 pages.
Zadesky et al., U.S. Office Action mailed Feb. 20, 2009, directed to U.S. Appl. No. 11/057,050; 25 pages.
Zadesky et al., U.S. Office Action mailed Aug. 6, 2009, directed to U.S. Appl. No. 11/057,050; 30 pages.
Zadesky et al., U.S. Office Action mailed Oct. 4, 2010, directed to U.S. Appl. No. 11/057,050; 31 pages.
Zadesky et al., U.S. Office Action mailed Mar. 5, 2009, directed to U.S. Appl. No. 11/477,469; 12 pages.
Zadesky et al., U.S. Office Action mailed Feb. 4, 2010, directed to U.S. Appl. No. 11/477,469; 14 pages.
Zadesky et al., U.S. Office Action mailed Nov. 16, 2010, directed to U.S. Appl. No. 11/477,469; 13 pages.
Prest et al., U.S. Office Action mailed Jun. 22, 2010, directed to U.S. Appl. No. 11/878,132; 32 pages.
Prest et al., U.S. Office Action mailed Jun. 22, 2010, directed to U.S. Appl. No. 11/882,882; 32 pages.
Prest et al., U.S. Office Action mailed Jun. 23, 2010, directed to U.S. Appl. No. 11/812,384; 29 pages.
Prest et al., U.S. Office Action mailed Jun. 22, 2010, directed to U.S. Appl. No. 11/882,890; 15 pages.
Prest et al., U.S. Office Action mailed Jun. 22, 2010, directed to U.S. Appl. No. 11/812,383; 21 pages.
Prest et al., U.S. Office Action mailed Jun. 23, 2010, directed to U.S. Appl. No. 11/882,889; 13 pages.
Bollinger et al., U.S. Office Action mailed Jun. 25, 2010, directed to U.S. Appl. No. 11/842,724; 22 pages.
Bollinger et al., U.S. Office Action mailed Mar. 21, 2011, directed to U.S. Appl. No. 11/842,724; 22 pages.
McKillop et al., U.S. Office Action mailed Sep. 16, 2010, directed to U.S. Appl. No. 11/591,752; 14 pages.
McKillop et al., U.S. Office Action mailed Mar. 24, 2011, directed to U.S. Appl. No. 11/591,752; 11 pages.
Zadesky et al., U.S. Office Action mailed Mar. 4, 2004, directed to U.S. Appl. No. 10/188,182; 8 pages.
Zadesky et al., U.S. Office Action mailed Jul. 30, 2004, directed to U.S. Appl. No. 10/188,182; 7 pages.
Zadesky et al., U.S. Office Action mailed Sep. 21, 2005, directed to U.S. Appl. No. 10/188,182; 10 pages.
Zadesky et al., U.S. Office Action mailed Oct. 4, 2007, directed to U.S. Appl. No. 11/386,238; 12 pages.
Zadesky et al.., U.S. Office Action mailed Oct. 4, 2007, directed to U.S. Appl. No. 11/806,957; 14 pages.
Zadesky et al., U.S. Office Action mailed Aug. 2, 2010, directed to U.S. Appl. No. 11/882,004; 9 pages.

Zadesky et al, U.S. Office Action mailed Feb. 1, 2011, directed to U.S. Appl. No. 11/882,004; 16 pages.
Zadesky et al., U.S. Office Action mailed Sep. 29, 2010, directed to U.S. Appl. No. 11/882,003; 13 pages.
Zadesky et al., U.S. Office Action mailed Mar. 16, 2011, directed to U.S. Appl. No. 11/882,003; 12 pages.
Marriott et al., U.S. Office Action mailed Jun. 2, 2006, directed to U.S. Appl. No. 10/722,948; 12 pages.
Marriott et al., U.S. Office Action mailed Dec. 12, 2006, directed to U.S. Appl. No. 10/722,948; 14 pages.
Marriott et al., U.S. Office Action mailed Jul. 13, 2007, directed to U.S. Appl. No. 10/722,948; 15 pages.
Marriott et al., U.S. Office Action mailed Jan. 30, 2008, directed to U.S. Appl. No. 10/722,948; 17 pages.
Marriott et al., U.S. Office Action mailed Aug. 19, 2010, directed to U.S. Appl. No. 11/882,422; 13 pages.
Hotelling, U.S. Office Action mailed Jan. 25, 2010, directed to U.S. Appl. No. 11/482,286; 17 pages.
Hotelling, U.S. Office Action mailed Sep. 1, 2009, directed to U.S. Appl. No. 11/482,286; 14 pages.
Hotelling, U.S. Office mailed Jun. 9, 2010, directed to U.S. Appl. No. 11/482,286; 21 pages.
Hotelling, U.S. Office Action mailed Oct. 1, 2010, directed to U.S. Appl. No. 11/482,286; 28 pages.
Hotelling, U.S. Office Action mailed Dec. 8, 2010, directed to U.S. Appl. No. 11/482,286; 33 pages.
Hotelling, U.S. Office Action mailed Aug. 18, 2010, directed to U.S. Appl. No. 11/882,424; 16 pages.
Hotelling et al., U.S. Office Action mailed Jul. 24, 2009, directed to U.S. Appl. No. 11/483,008; 17 pages.
Hotelling et al., U.S. Office Action mailed Mar. 30, 2010, directed to U.S. Appl. No. 11/483,008; 20 pages.
Hotelling et al., U.S. Office Action mailed Oct. 27, 2010, directed to U.S. Appl. No. 11/483,008; 23 pages.
Hotelling et al., U.S. Office Action mailed Jul. 27, 2009, directed to U.S. Appl. No. 11/882,420; 17 pages.
Elias et al., U.S. Office Action mailed Sep. 17, 2008, directed to U.S. Appl. No. 11/203,692; 8 pages.
Elias et al., U.S. Office Action mailed Feb. 23, 2009, directed to U.S. Appl. No. 11/203,692; 13 pages.
Elias et al., U.S. Office Action mailed Aug. 4, 2009, directed to U.S. Appl. No. 11/203,692; 12 pages.
Elias et al., U.S. Office Action mailed Mar. 30, 2010, directed to U.S. Appl. No. 11/203,692; 15 pages.
Elias et al., U.S. Office Action mailed Jun. 11, 2010, directed to U.S. Appl. No. 11/203,692; 17 pages.
Elias et al., U.S. Office Action mailed Nov. 22, 2010, directed to U.S. Appl. No. 11/203,692; 6 pages.
Bull, U.S. Office Action mailed Jul. 9, 2010, directed to U.S. Appl. No. 11/849,801; 13 pages.
Bull, U.S. Office Action mailed Feb. 4, 2011, directed to U.S. Appl. No. 11/849,801; 22 pages.
Weber et al., U.S. Office Action mailed Jun. 7, 2010, directed to U.S. Appl. No. 11/856,530; 15 pages.
Weber et al, U.S. Office Action mailed Jan. 7, 2011, directed to U.S. Appl. No. 11/856,530; 13 pages.
Rathnam et al., U.S. Office Action mailed Mar. 24, 2011, directed to U.S. Appl. No. 12/205,757; 14 pages.
Weber et al., U.S. Office Action mailed Oct. 13, 2010, directed to U.S. Appl. No. 12/205,795; 15 pages.
Weber et al., U.S. Office Action mailed Jan. 7, 2011, directed to U.S. Appl. No. 12/205,795; 21 pages.
Weber et al., U.S. Office Action mailed Feb. 17, 2011, directed to U.S. Appl. No. 12/844,502; 11 pages.
Lynch et al., U.S. Office Action mailed Jan. 27, 2010, directed to U.S. Appl. No. 11/499,360; 8 pages.
Lynch et al., U.S. Office Action mailed Oct. 5, 2009, directed to U.S. Appl. No. 11/499,360; 7 pages.
Bollinger, U.S. Appl. No. 60/858,404 filed Nov. 13, 2006, entitled "Method of Capacitively Sensing Finger Position"; 13 pages.
Elias et al., U.S. App. No. 60/522,107 filed Aug. 16, 2004, entitled, "A Method for Increasing the Spatial Resolution of Touch Sensitive Devices"; 15 pages.

Fisher et al., U.S. Appl. No. 61/036,804 filed Mar. 14, 2008 entitled "Switchable Sensor Configurations"; 46 pages.
Grignon et al., U.S. Appl. No. 60/755,656 filed Dec. 30, 2005, entitled "Touch Pad with Feedback"; 109 pages.
Hotelling, U.S. Appl. No. 60/658,777 titled Multi-Functional Handheld Device, filed Mar. 4, 2005; 68 pages.
Lampell et al., U.S. Appl. No. 60/810,423 filed Jun. 2, 2006, entitled "Techniques for Interactive Input to Portable Electronic Devices"; 53 pages.
Prest et al., U.S. Appl. No. 60/850,662 filed Oct. 11, 2006, entitled,"Capacitive Scroll Wheel"; 21 pages.
Rathnam et al., U.S. Appl. No. 60/992,056 filed Dec. 3, 2007, entitled, "Scroll Wheel Circuit Arrangements and Methods of Use Thereof"; 42 pages.
Rathnam et al., U.S. Appl. No. 61/017,436 filed Dec. 28, 2007, entitled, "Multi-Touch Scroll Wheel Circuit Arrangements And Processing Methods"; 58 pages.
Robbin et al., U.S. Appl. No. 60/387,692 entitled "Method and Apparatus for Use of Rotational User Inputs", filed Jun. 10, 2002.
Robbin et al., U.S. Appl. No. 60/399,806 entitled "Graphical User Interface and Methods of Use Thereof in a Multimedia Player", filed Jul. 30, 2002.
Robbin, U.S. Appl. No. 60/346,237 entitled, "Method and System for List Scrolling", filed Oct. 22, 2001; 12 pages.
Rothkopf, U.S. Appl. No. 60/935,854 titled "Compact Media Players", filed Sep. 4, 2007; 36 pages.
Weber et al., U.S. Appl. No. 61/020,531 filed Jan. 11, 2008 entitled "Modifiable Clickwheel Text ", 11 pages.
Weber et al., U.S. App. No. 61/025,531 filed Feb. 1, 2008 entitled "Co-Extruded Materials and Methods"; 11 pages.
Zadesky et al., U.S. Appl. No. 60/359,551 entitled "Touchpad for Handheld Device," filed Feb. 25, 2002; 34 pages.
Zadesky et al., U.S. Appl. No. 60/714,609 entitled "Scrolling Input Arrangements Using Capacitive Sensors on a Flexible Membrane," filed Sep. 6, 2005; 17 pages.
Australian Office Action issued Aug. 19, 2009, directed to AU 20006333374; 2 pages.
Australian Office Action issued Nov. 12, 2009, directed to AU 20006333374; 2 pages.
Australian Office Action issued Apr. 15, 2010, directed to AU Application No. 2006333374; 2 pages.
Canadian Office Action mailed Nov. 15, 2011, directed to CA Application No. 2,635,517; 5 pages.
Chinese Office Action issue Dec. 29, 2006, directed to CN Application No. 200510103886.3, 25 pages.
Chinese Office Action dated Aug. 10, 2010, directed to corresponding application No. 200680053630.9; 16 pages.
Second Office Action dated Jan. 5, 2012, directed to Chinese Application No. 200680053630.9; 7 pages.
German Office Action dated Oct. 19, 2009, directed to corresponding application No. 11 2006 003 531.2-53, 9 pages. ✓.
German Office Action mailed Jul. 26, 2010 directed to counterpart application No. 112006003531.2; 6 pages.
EP Communication Pursuant to Article 94(3) EPC dated Aug. 13, 2009, directed to Application No. 06 838 571.5; 5 pages.
EP Communication under Rule 71(3) EPC dated Feb. 21, 2011, directed to application No. 06838571.5; 66 pages.
GB Search Report mailed Feb. 9, 2009, directed to counterpart GB Application No. 0811605.5; 4 pages.
KIPO's Notice of Preliminary Rejection dated Feb. 19, 2010, directed to counterpart application No. 10-2008-7018716; 9 pages.
Third Office Action dated Aug. 2, 2012, directed to Chinese Patent Application No. 200680053630.9; 14 pages.
Office Action mailed Jan. 22, 2013, directed to Canadian Application No. 2,635,517; 4 pages.
First Examination Report dated May 10, 2013, directed to Indian Patent Application No. 2583/KOLNP/2008; 3 pages.

* cited by examiner

ILLUMINATED TOUCHPAD

CROSS REFERENCE TO RELATED APPLICATIONS

This application is a continuation of U.S. patent application Ser. No. 11/394,493, filed Mar. 31, 2006, which claims priority benefit of U.S. Provisional Patent Application No. 60/755,656, filed Dec. 30, 2005, entitled "TOUCH PAD WITH FEEDBACK," which is hereby incorporated herein by reference.

This application is related to the following applications, all of which are herein incorporated by reference:

U.S. patent application Ser. No. 10/188,182, titled "TOUCH PAD FOR HANDHELD DEVICE", filed Feb. 25, 2002;

U.S. patent application Ser. No. 10/722,948, titled "TOUCH PAD FOR HANDHELD DEVICE", filed Nov. 25, 2003;

U.S. patent application Ser. No. 10/643,256, titled "MOVABLE TOUCH PAD WITH ADDED FUNCTIONALITY", filed Aug. 18, 2003;

U.S. patent application Ser. No. 10/840,862, titled "MULTIPOINT TOUCHSCREEN", filed May 6, 2004; and U.S. patent application Ser. No. 11/115,539, titled "HAND HELD ELECTRONIC DEVICE WITH MULTIPLE TOUCH SENSING DEVICES", filed Apr. 26, 2005.

BACKGROUND OF THE INVENTION

1. Field of the Invention

The present invention relates generally to touch pads that provide visual feedback. More particularly, the present invention relates to illuminated touch pads that use light to provide feedback.

2. Description of the Related Art

There exist today many styles of input devices for performing operations in a computer system. The operations generally correspond to moving a cursor and/or making selections on a display screen. By way of example, the input devices may include buttons or keys, mice, trackballs, touch pads, joy sticks, touch screens and the like.

Touch pads, in particular, are becoming increasingly popular because of their ease and versatility of operation as well as to their declining price. Touch pads allow a user to make selections and move a cursor by simply touching an input surface via a finger or stylus. In general, the touch pad recognizes the touch and position of the touch on the input surface and the computer system interprets the touch and thereafter performs an action based on the touch event.

Touch pads typically include an opaque touch panel, a controller and a software driver. The touch panel registers touch events and sends these signals to the controller. The controller processes these signals and sends the data to the computer system. The software driver translates the touch events into computer events.

Although touch pads work well, improvements to their form feel and functionality are desired. By way of example, it may be desirable to provide visual stimuli at the touch pad so that a user can better operate the touch pad. For example, the visual stimuli may be used (among others) to alert a user when the touch pad is registering a touch, alert a user where the touch is occurring on the touch pad, provide feedback related to the touch event, indicate the state of the touch pad, and/or the like.

SUMMARY OF THE INVENTION

The invention relates, in one embodiment, to an illuminated input device. The illuminated input device includes an object sensing mechanism capable of sensing a user input over an input surface. The illuminated input device also includes a visual feedback system configured to illuminate the input surface in association with a user input.

The invention relates, in another embodiment, to a method of operating an input device. The method includes sensing an object over an input surface. The method also includes and illuminating at least a portion of the input surface when an object is sensed.

The invention relates, in another embodiment, to a method of operating an input device. The method includes illuminating at least a portion of an input surface when an object is detected over the input surface. The method also includes adjusting the illumination when the object is moved over the input surface.

The invention relates, in another embodiment, to a method of operating an input device. The method includes detecting a user input over the input surface. The method also includes determining an input state of the input device based on the user input. The method additionally includes illuminating the input surface based on the input state of the input device. Each input state having a different illumination profile.

BRIEF DESCRIPTION OF THE DRAWINGS

The invention may best be understood by reference to the following description taken in conjunction with the accompanying drawings in which.

DETAILED DESCRIPTION OF THE INVENTION

The present invention pertains to improved feedback mechanisms for touch pads. One aspect relates to devices capable of illuminating the touch sensitive surface of the touch pad. Not just in backlighting so that the user knows where the touch pad is located in low light conditions, but also to give other feedback related to how the touch pad is being used. Another aspect relates to methods for providing feedback at the touch pad. For example, changing intensity or color based on motion characteristics- and/or pressure, providing an illumination point that follows a finger as it is moved about the touch sensitive surface, showing different states with varying levels of brightness or color, etc.

Embodiments of the invention are discussed below with reference to FIGS. 1-25. However, those skilled in the art will readily appreciate that the detailed description given herein with respect to these figures is for explanatory purposes as the invention extends beyond these limited embodiments.

Figure 1:
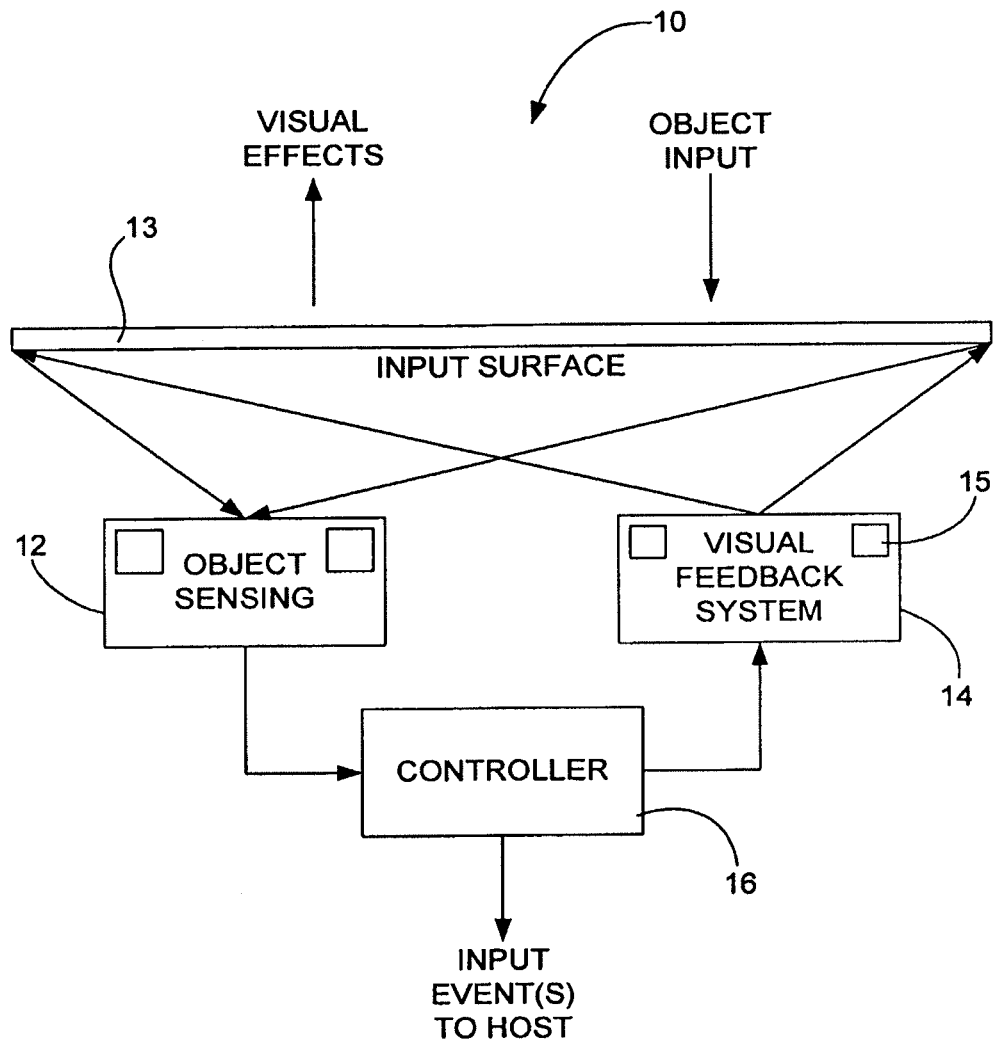
FIG. 1 is a simplified block diagram of an input device, in accordance with one embodiment of the present invention.

FIG. 1 is a simplified block diagram of an input device 10, in accordance with one embodiment of the present invention. The input device 10 may be a standalone peripheral device that connects to a host device through wired or wireless connections or it may be integrated into a host device (e.g., hard wired). In either case, the input device 10 is configured to provide inputs to the host device. Examples of host devices include any consumer related electronic device such as computers, PDAs, media players, telephones, etc.

In order to generate inputs as for example initiating commands, making selections or tracking, the input device 10 includes an object sensing mechanism 12 configured to detect one or more objects in close proximity to and/or in contact with an input surface 13. The object sensing mechanism 12 may be based on proximity sensing and/or touch sensing.

In the case of proximity sensing, the input surface 13 may be the surface directly underneath a proximity sensing field. The object sensing mechanism 12 generates input signals when an object such as a finger (or stylus) is moved above the input surface and within the sensing field (e.g., x and y plane), from an object holding a particular position above the surface and within the sensing field and/or by an object moving through or in and out of the sensing field (e.g., z direction). Proximity detection may be based on technologies including but not limited to capacitive, electric field, inductive, hall effect, reed, eddy current, magneto resistive, optical shadow, optical visual light, optical IR, optical color recognition, ultrasonic, acoustic emission, radar, heat, sonar, conductive or resistive and the like.

In the case of touch sensing, the input surface 13 may be a touch surface that is sensitive to direct physical touch. The object sensing mechanism 12 generates input signals when an object in contact with the input surface 13 is moved across the input surface (e.g., x and y plane), from an object holding a particular position on the input surface and/or by an object tapping on the input surface. Touch sensing may be based on technologies including but not limited to resistive, capacitive, infrared and surface acoustic wave. Examples of touch sensing devices that utilize these technologies include touch pads, touch screens, and the like.

To elaborate, the sensing region, i.e., input surface or the sensing field above the input surface, is typically divided into several independent and spatially distinct sensing points, nodes or regions. The sensing points, which are typically hidden from view, are dispersed about the sensing region with each sensing point representing a different position in the sensing region. The sensing points may be positioned in a grid or a pixel array where each pixilated sensing point is capable of generating a signal. In the simplest case, a signal is produced each time an object is positioned over a sensing point. When an object is placed over multiple sensing points or when the object is moved between or over multiple sensing points, multiple signals can be generated. The sensing points generally map the sensing region into a coordinate system such as a Cartesian coordinate system, a Polar coordinate system or some other coordinate system. Furthermore, the touch sensing means may be based on single point sensing or multipoint sensing. Single point sensing is capable of only distinguishing a single object at any given time, while multipoint sensing is capable of distinguishing multiple objects at the same time.

The input device 10 also includes a visual feedback system 14 configured to output visual effects at the input surface 13 in association with the object sensing system 12. The visual feedback system 14 is dedicated to enhancing the operation of the input device 10 by providing visual feedback to the user when making touch or proximity inputs via the object sensing system 12. For example, the visual effects may be used to indicate the location of the input surface 13 thereby making inputting easier for the user (e.g., backlighting).

Alternatively or additionally, the visual effects may be used during and after the input event to dynamically indicate characteristics associated with the input events. The characteristics may for example include when and where and the number of inputs being made relative to the input surface 13. This type of feedback also improves inputting by providing visual cues to the user about the input device 10 as the input device 10 is used.

Alternatively or additionally, the visual effects may be used before an input event to invoke the user to perform a particular input event at the input surface 13. This type of feedback also improves inputting by helping the user make appropriate inputs or helping them learn input gestures (e.g., timing, location and movements).

In most cases, the visual effects (outputs) are linked or tied to and associated with the input events being performed. Although capable of, they typically do not provide external outputs associated with events occurring outside the input device 10. That is, the visual effects typically do not operate separately as an output for any device other than the input device 10 (e.g., the visual feedback system should not be considered a separate display).

The visual feedback system 14 includes one or more visual changing elements 15. The visual changing elements 15 may be separate of integral with the sensing elements of the object sensing system 12. In some cases, the one or more of the visual changing elements 15 may be mapped, associated with or tied to one or more of the sensing nodes of the object sensing system. The number of visual changing elements tied to a particular sensing node may be less than, equal to, or more than the number of sensing nodes.

The resolution of the visual changing elements 15 can be widely varied. In one embodiment, the resolution of the visual changing elements 15 is greater than the sensing nodes (e.g., the number of visual changing elements is greater than the number of sensing nodes). In another embodiment, the resolution of the visual changing elements 15 is substantially equal to the resolution of the sensing nodes (e.g., the number of visual changing elements is substantially equal to the number of sensing nodes). In yet another embodiment, the resolution of the visual changing elements 15 is less than the resolution of the sensing nodes (e.g., the number of visual changing elements is less than the number of sensing nodes). The resolution generally depends on the needs of the particular input device. In some cases, high resolution is need to create dynamic visual effects such a graphical effects. In other cases, only low resolution is required, as for example to visually change a region as large as a finger.

The visual feedback system 14 may be widely varied. In one embodiment, the visual feedback system 14 is a light based system that illuminates the input surface 13. In this embodiment, the visual changing elements 15 are embodied as light emitting devices. The light emitting devices may include one or more light sources, and a light distribution system for distributing the light at the input surface 13. In some cases, the light from the light sources may be diffused so that the input surface 13 emits a characteristic glow (not a precise point of light, but rather a blurred glowing effect or phosphorous glow). That is, the input surface can generate glowing special effects that may for example provide backlighting to the input surface 13 and/or provide an outline, trace or shadow of the sensed object on the input surface 13. The glowing special effects may even indicate a state of the input device as for example when the input device is in a tracking state or gesture state.

Alternatively, the visual feedback system may be a graphically based system that generates graphics at the input surface. LCDs, OLEDs and electronic inks are examples of graphically based systems. These devices however can be cost prohibitive and more complex to implement when compared to light based systems.

The input device 10 also includes a controller 16 that is operatively coupled to the object sensing device 12 and visual feedback system 14. The controller 16 monitors signals generated at the input surface 13 and sends corresponding control signals associated therewith to the host device, which interprets the signals in accordance with its programming (e.g., input events). The controller 16 also generates visual effect commands for controlling the visual effects outputted by the visual feedback system 14. Single or multiple commands can be generated to change one, some or all of the visual changing elements at the same time. Further, the commands may be based on the signals generated via the object sensing device 12.

In one embodiment, the controller 16 may instruct the visual changing elements to change in a non-trivial manner in the region of the detected object in order to indicate a location of the object relative to the input surface 13. In another embodiment, the commands may be based on instructions from the host device. For example, the host device may instruct the input device 10 to backlight the input surface 13 or alternatively to alter the input surface in such a way as to prompt the user to perform a particular event relative to the input surface (e.g., the host device may use the input surface to teach the user how to perform a particular gesture).

Figure 2:
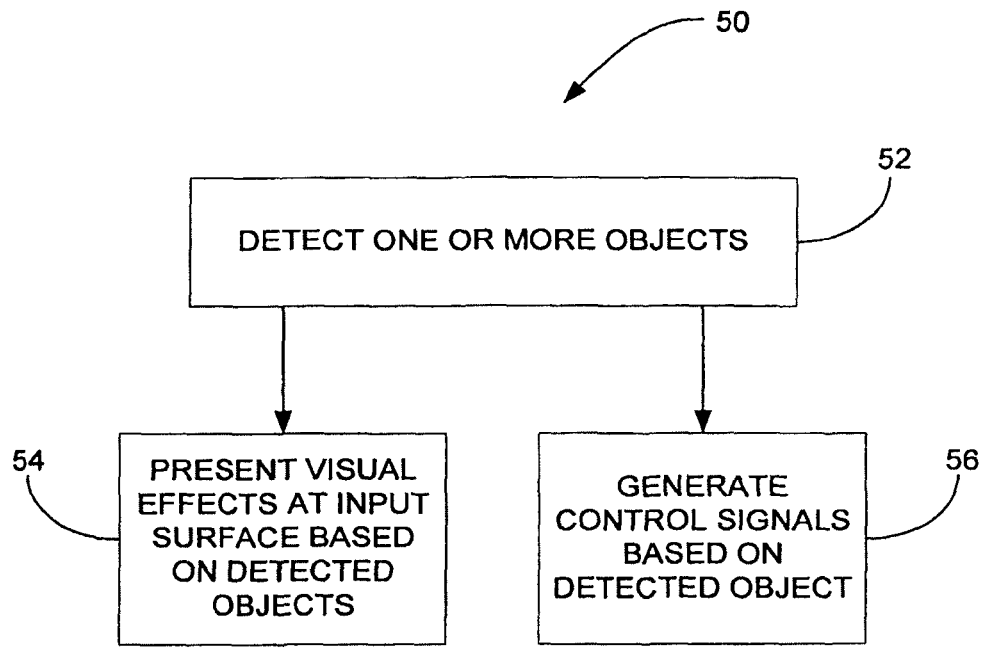
FIG. 2 is a method of operating an input device, in accordance with one embodiment of the present invention.

FIG. 2 is a method 50 of operating an input device, in accordance with one embodiment of the present invention. The input device may for example be the input device shown and described in FIG. 1. The method begins at block 52 where one or more objects are detected at a sensing region. This may for example be accomplished with the object sensing device described above. Following block 52, the method proceeds to blocks 54 and 56. In block 54, visual effects are displayed at the sensing region based on the detected objects. This may for example be accomplished with the visual feedback system described above.

In one embodiment, the visual effects are performed in the region of the detected object. For example, in the case of a light based system, the area under and/or around the detected object may be illuminated. As should be appreciated, the visual effects can be made to follow the object as it is moved around the sensing region. In fact in some cases, the visual effects may include a leading edge, a body, and/or a trailing edge. The leading edge indicates where the object is directed, the body indicates the current location of the object, and the trailing edge indicates where the object has been.

In another embodiment, the visual effects are performed to indicate the state of the object sensing event. For example, if one object is detected, a first visual effect may be performed, and if multiple objects are detected, a second visual effect may be performed. This may be beneficial in cases where single objects are used for tracking and multiple objects are used for gesturing. See for example U.S. patent application Ser. No. 10/903,964, which is herein incorporated by reference.

In block 56, control signals are generated based on the detected objects. This may for example be accomplished with the controller described above. The signals are reported to a host device as an input event, and the host device interprets the signals in accordance with its programming.

Figure 3:
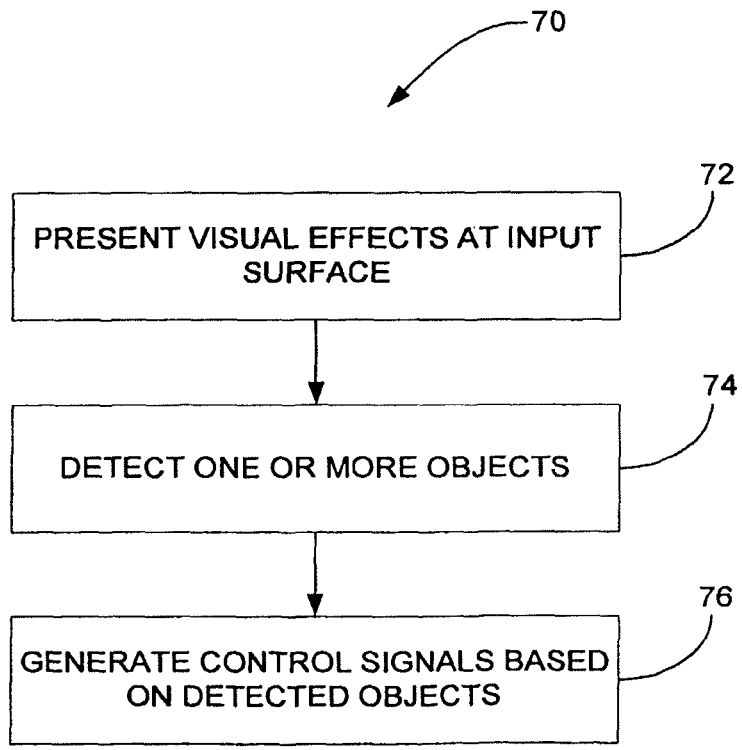
FIG. 3 is a method of operating an input device, in accordance with one embodiment of the present invention.

FIG. 3 is a method 70 of operating an input device, in accordance with one embodiment of the present invention. The input device may for example be the input device shown and described in FIG. 1. The method begins at block 72 where visual effects are displayed at the sensing region. This may for example be accomplished with the visual feedback system described above.

In one embodiment, the visual effects are based on a control signal from the host device. For example, the host device may instruct the visual feedback system to output visual effects to encourage a user to place an object at a particular location at the input surface or to perform a gesture during a particular operation in the host device (e.g., training sequence).

Following block 72, the method proceeds to blocks 74 and 76. In block 74, the sensing region is monitored. This may for example be accomplished with the object sensing device described above. In block 76, control signals are generated when objects are detected in the sensing region. This may for example be accomplished with the controller described above. The signals may be used by the host device as an input event.

Figure 4:
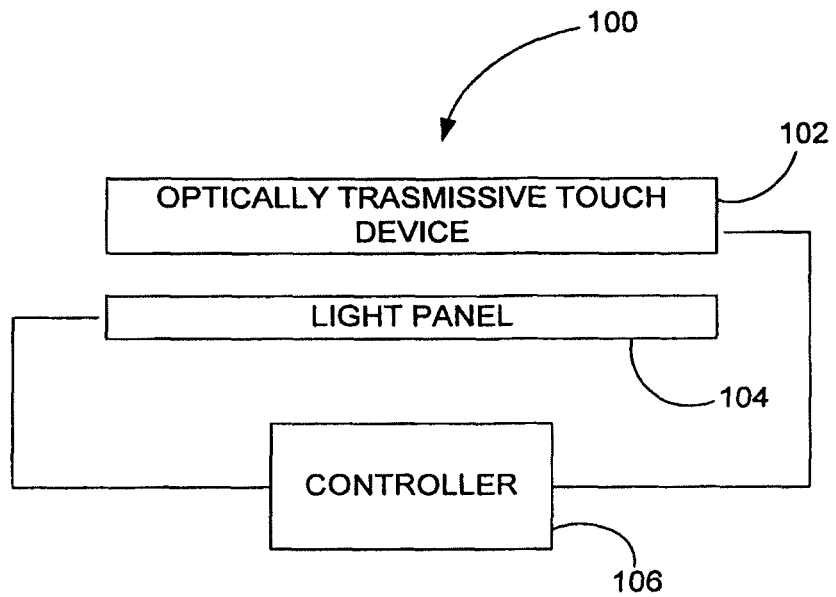
FIG. 4 is a simplified diagram of an illuminated touch pad, in accordance with one embodiment of the present invention.

FIG. 4 is a simplified diagram of touch pad 100, in accordance with one embodiment of the present invention. In this embodiment, the touch pad 100 includes an optically transmissive touch sensing device 102 disposed over a light panel 104. Both the touch sensing device 102 and the light panel 104 communicate with a controller 106 that monitors touch inputs on the touch sensitive surface 108 of the touch sensing device 102 and that directs the light panel 104 to emit light in the direction of the touch sensing device in a controlled manner.

The touch sensing device may be widely varied. The touch sensing device may for example be selected from any of those used for touch screens. An example of a touch screen that may be used can be found in U.S. patent application Ser. No. 10/840,862, which is herein incorporated by reference.

The light panel may also be widely varied. In one embodiment, the light panel is a pixilated light device that includes a plurality of light sources that are distributed over an extended area such as the touch sensitive surface of the touch sensing device. The light panel may include a plurality of light emitting diodes (LEDs) that are laid out in a matrix such as rows and columns. Any number of LEDs may be used. The number generally depends on the desired resolution of the light panel. In the simplest case, LEDs are placed next to or adjacent one another in rows and columns on a PCB that is sized similarly to the touch sensing device (e.g., covers the same area).

Figure 5:
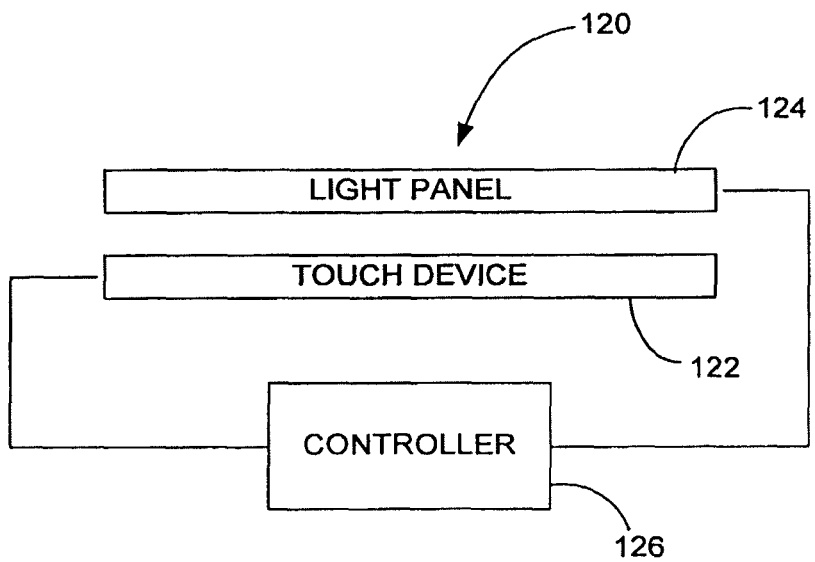
FIG. 5 is a simplified diagram of an illuminated touch pad, in accordance with one embodiment of the present invention.

FIG. 5 is a simplified diagram of a touch pad 120, in accordance with one embodiment of the present invention. In this embodiment, the touch pad 120 includes an opaque or alternatively an optically transmissive touch sensing device 122 disposed below a light panel 124. Both the touch sensing device 122 and the light panel 124 communicate with a controller 126 that monitors touch inputs on the touch sensitive surface 128 of the touch sensing device 122 and that directs the light panel 124 to emit light in a controlled manner.

The touch sensing device may be widely varied. The touch sensing device may for example be selected from any of those used for touch pads or touch screens. An example of a touch pad that may be used can be found in U.S. patent application Ser. Nos. 10/188,182, 10/722,948 and 10/643,256, all of which are herein incorporated by reference.

The light panel may also be widely varied. Unlike the light panel discussed in FIG. 4, this light panel needs to allow touch sensing to occur therethrough. The light panel may further need to be somewhat diffused to hide the electronics displayed underneath the light panel. In one embodiment, the light panel includes one or more light sources and a light distribution mechanism for distributing the light from the light source over an extended area such as the touch sensitive surface of the touch sensing device. The light distribution mechanism may include for example light pipes or light guides that allow the light sources to be placed away from the sensing field. In one embodiment, the light distribution mechanism is formed from a dielectric material so that touch sensing can occur therethrough with impediments (e.g., capacitance). By way of example, transparent or semi-transparent plastic materials may be used.

Figure 6A:
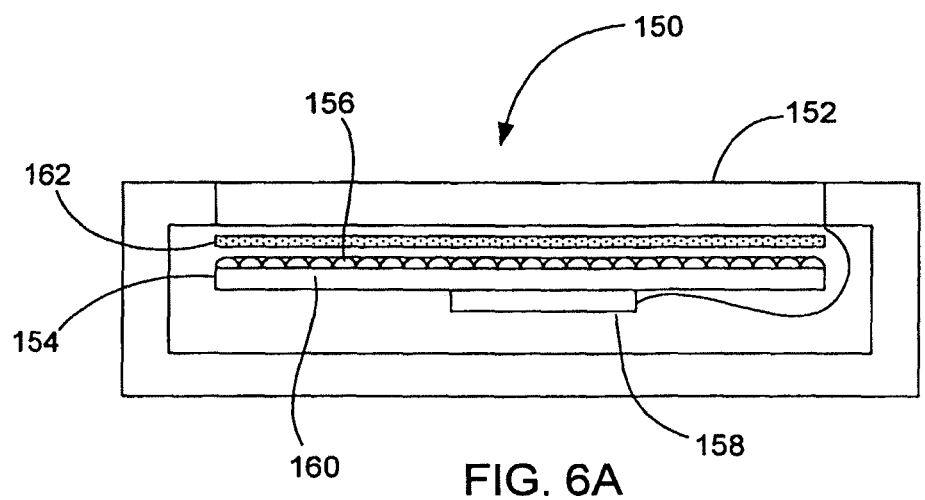
FIG. 6A is a side view of an illuminated touch pad, in accordance with one embodiment of the present invention.
Figure 6B:
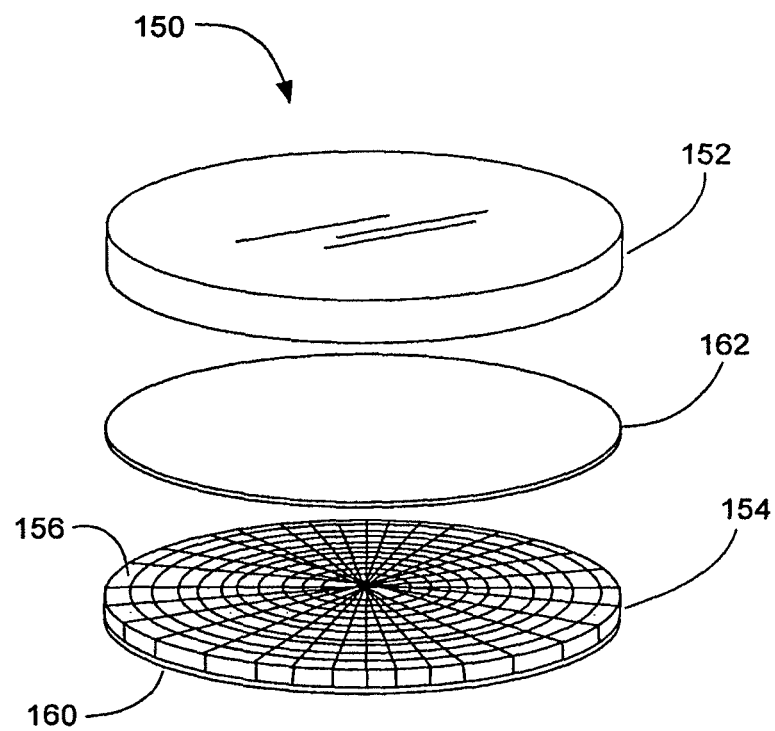
FIG. 6B is an exploded perspective view of the illuminated touch pad of FIG. 6A, in accordance with one embodiment of the present invention.

FIGS. 6A and 6B are diagrams of an illuminable touch pad 150, in accordance with one embodiment of the present invention. The touch pad 150 includes a translucent or semi-translucent touch screen 152 and a pixilated light panel 154 disposed below the touch screen 152. The touch screen 152 is divided into several independent and spatially distinct sensing points, nodes or regions. The sensing points, which are hidden from view (transparent), are dispersed about the touch screen 152 with each sensing point representing a different position on the surface of the touch screen (or touch screen plane). The sensing points may be positioned in a grid or a pixel array where each pixilated sensing point is capable of generating a signal. In the simplest case, a signal is produced each time an object is positioned over a sensing point. When an object is placed over multiple sensing points or when the object is moved between or over multiple sensing point, multiple signals can be generated.

In one embodiment, the touch screen 152 includes a plurality of capacitance sensing nodes. The capacitive sensing nodes may be widely varied. For example, the capacitive sensing nodes may be based on self-capacitance or mutual capacitance. In self-capacitance, the "self" capacitance of a single electrode is measured as for example relative to ground. In mutual capacitance, the mutual capacitance between at least first and second electrodes is measured. In either cases, each of the nodes works independent of the other nodes so as to produce simultaneously occurring signals representative of different points on the touch screen 152.

In order to produce a transparent touch screen 152, the capacitance sensing nodes may be formed with a transparent conductive medium such as indium tin oxide (ITO).

In self-capacitance sensing arrangements, the transparent conductive medium is patterned into spatially separated electrodes and traces. Each of the electrodes represents a different coordinate and the traces connect the electrodes to a capacitive sensing circuit. The coordinates may be associated with Cartesian coordinate system (x and y), Polar coordinate system (r, θ) or some other coordinate system. During operation, the capacitive sensing circuit monitors changes in capacitance that occur at each of the electrodes. The positions where changes occur and the magnitude of those changes are used to help recognize the touch events. A change in capacitance typically occurs at an electrode when a user places an object such as a finger in close proximity to the electrode, i.e., the object steals charge thereby affecting the capacitance.

In mutual capacitance, the transparent conductive medium is patterned into a group of spatially separated lines formed on two different layers. Driving lines are formed on a first layer and sensing lines are formed on a second layer. Although separated by being on different layers, the sensing lines traverse, intersect or cut across the driving lines thereby forming a capacitive coupling node. The manner in which the sensing lines cut across the driving lines generally depends on the coordinate system used. For example, in a Cartesian coordinate system, the sensing lines are perpendicular to the driving lines thereby forming nodes with distinct x and y coordinates. Alternatively, in a polar coordinate system, the sensing lines may be concentric circles and the driving lines may be radially extending lines (or vice versa). The driving lines are connected to a voltage source and the sensing lines are connected to capacitive sensing circuit. During operation, a current is driven through one driving line at a time, and because of capacitive coupling, the current is carried through to the sensing lines at each of the nodes (e.g., intersection points). Furthermore, the sensing circuit monitors changes in capacitance that occurs at each of the nodes. The positions where changes occur and the magnitude of those changes are used to help recognize the multiple touch events. A change in capacitance typically occurs at a capacitive coupling node when a user places an object such as a finger in close proximity to the capacitive coupling node, i.e., the object steals charge thereby affecting the capacitance.

Referring now to the light panel 154, the light panel 154 includes a light emitting surface that is typically divided into several independent and spatially distinct illumination points, nodes or regions 156. The illumination points 156 are dispersed about the light emitting surface with each illumination point 156 representing a different position in the light emitting surface. The illumination points 156 may be positioned in a grid or a pixel array where each pixilated illumination point is capable of emitting light. The illumination points 156 generally map the illumination region into a coordinate system such as a Cartesian coordinate system, a Polar coordinate system or some other coordinate system. In some cases, the illuminations points may be laid out in a pattern similar to the sensing points of the touch panel 152 (e.g., same coordinate system, same number of points). In other cases, the illumination points 156 may be laid out in a pattern that is different than the sensing points of the touch panel 152 (e.g., different coordinate system, different number of points).

The light panel 154 may be widely varied. In the illustrated embodiment, the illumination points 156 are embodied as individual light emitting diodes that are placed in a grid like manner thereby forming a pixilated illumination area, i.e., each of the light emitting diodes forms an illumination node. The grid may be oriented rows and columns (x and y) or angular/radial segments (as shown). Furthermore, the LEDs are attached to the printed circuit board 160 and operatively coupled to the controller 158 located on the backside of the printed circuit board 160.

The touch screen 152 is also operatively coupled to the controller 158 as for example using a flex circuit that attached to the printed circuit board 160. During operation, the controller 158 monitors the changes in capacitance and generates control signals based on these changes. The controller 158 also separately adjusts the intensity of each of the LEDs to illuminate portions or all of the touch screen 152 in a controlled manner. That is, the light panel 154 can produce any number of various light effects by selectively controlling the intensities of the LED's via the controller 158. Because the touch screen 154 is translucent, the light can be seen through the touch screen 154.

In some cases, the touch pad 150 may further include a light diffuser 162. The light diffuser 162 is configured to diffuse the light being emitted by the light panel 154. This may be done to normalize the light intensity of the LEDs, to produce a characteristic glow at the input surface, and/or to hide the physical parts of the touch pad located underneath the light diffuser.

Although the light diffuser 162 can include color components, in most cases, the light diffuser appears as a white or semi transparent white material. When embodied with white elements, the light diffuser 162 takes on the color of light emitted by the LEDs. Generally speaking, the light diffuser 162 is positioned somewhere between the LEDs and the input surface. More particularly, the light diffuser 162 can be placed above, within or underneath the touch screen. For example, a light diffuser 162 can be placed on the upper surface, lower surface, or in the layers of the touch screen. Alternatively or additionally, the light diffuser 162 may be integrated with or attached to the light panel or even be a separate component disposed between the light panel 154 and touch screen 152 (as shown).

The light diffuser 162 may be embodied in many different forms including for example surface treatments on one or more layers of the touch screen, additives in one or more layers of the touch screen, an additional layer in the touch screen, rigid plastic inserts disposed above or below the touch screen, flexible labels disposed above or below the touch screen, and the like. The light diffuser 162 may even be the ITO coating used to form the sensing components of the touch screen (e.g., the greater the density of the ITO coating, the greater the amount of light that is diffused).

In the illustrated embodiment, the light diffuser 162 is a plastic insert that includes light scattering additives. Furthermore, the light diffuser 162 is disposed between the light panel 154 and the touch screen 152.

It should be pointed out that LED's offer many advantages over other light sources. For example, LED's are relatively small devices that are energy efficient and long lasting. LED's also run relatively cool and are low in cost. Furthermore, LED's come in various colors such as white, blue, green, red and the like. The pixilated LEDs may be configured to emit that same color of light or a different color of light.

Furthermore, although shown as single LEDs, it should be noted that the LEDs may be embodied as an integrated array of LEDs that are grouped together as for example an array of red, blue, green and/or white LEDs that cooperate to produce a resultant color (via color mixing). The resultant color may be a wide range of colors, as for example, a majority of the colors from the color spectrum. During operation, the controller can produced almost any color by adjusting the intensity of each of the colored LED's. By way of example, in order to produce the highest shade of red, the intensities of the green and blue are reduced to zero intensity and the intensity of the red is increased to its peak intensity. The highest shades of green and blue can be implemented in a similar manner. In addition, in order to produce a shade of red and green, the intensities of the green and red are increased to levels above zero intensity while the intensity of blue is reduced to zero intensity. Shades of green and blue and blue and red can be implemented in a similar manner. Furthermore, in order to produce shades of white, the intensities of the red, green and blue are increased to the same levels above zero intensity, or alternatively the red, green and blue LED's are turned off and a white LED is turned on.

Although the integrated LED array is described as using the three primary colors, it should be noted that this is not a limitation and that other combinations may be used. For example, the integrated LED array may be configured to include only two of the primary colors or it may only include LED's with a single color.

When the LEDs are capable of generating any color, unique input surfaces can be produced. By way of example, the touch pad can produce an input surface with rainbow stripes, different colored spots, different colored quadrants or sections and the like. The touch pad can also produce an input surface that has a dynamically changing pattern. This is typically accomplished by activating distinct LED's at different times or by adjusting the intensities of distinct LED's at different times.

Figure 7A:
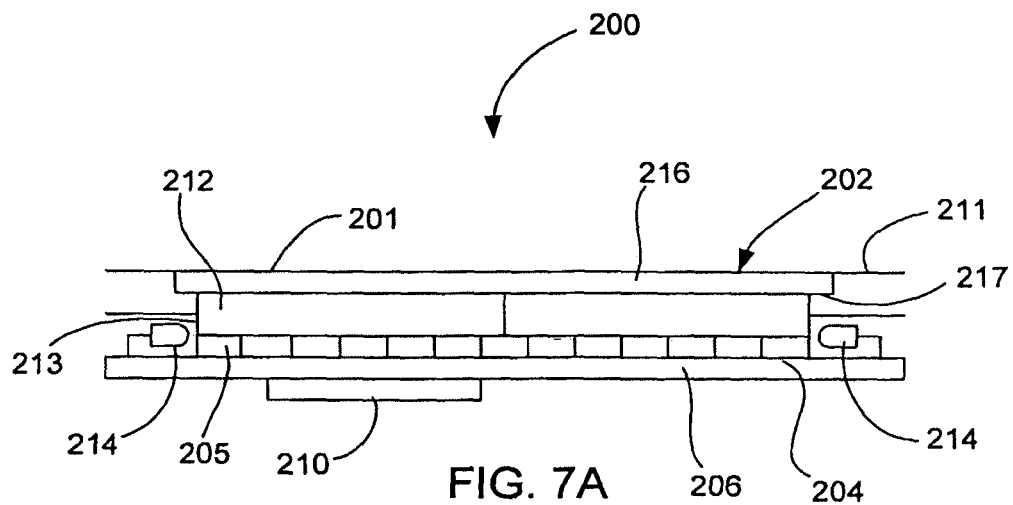
FIG. 7A is a side view of an illuminated touch pad, in accordance with one embodiment of the present invention.
Figure 7B:
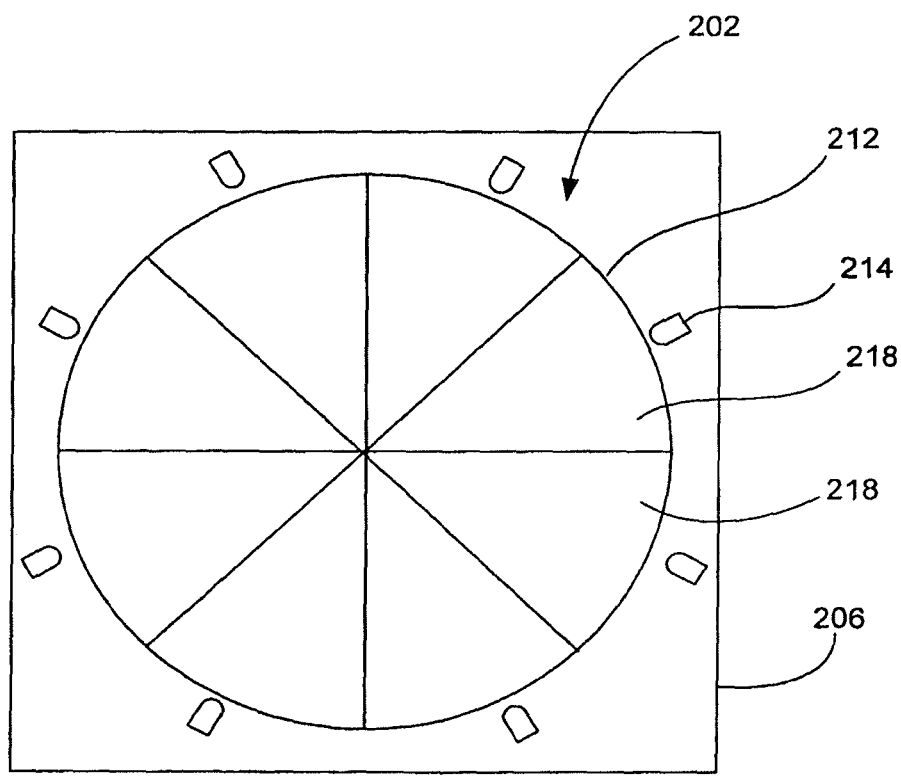
FIG. 7B is a top view, in part, of the touch pad of FIG. 7A, in accordance with another embodiment of the present invention.

FIGS. 7A and 7B are diagrams of a touch pad 200, in accordance with another embodiment of the present invention. The touch pad 200 includes various layers including a light panel 202, an electrode layer 204 and a printed circuit board 206 (PCB). The electrode layer 204 is positioned on the PCB 206 and the light panel 202 is placed above the electrode layer 204.

The electrode layer 204 includes a plurality of spatially separated electrodes 205 configured to detect changes in capacitance at an upper surface 208 of the light panel 202. Each of the electrodes 205 is operatively coupled to a controller 210 located on the backside of the printed circuit board 206. During operation, the controller 210 monitors the changes in capacitance and generates control signals based on these changes.

The light panel 202 includes a light distribution panel 212 disposed over the electrode layer 204 and one or more side mounted light emitting diodes 214 disposed around the periphery of the light distribution panel 212. The side mounted light emitting diodes 214 are configured to direct light into a different portion of the light distribution panel 212. Alternatively, a light pipe may be used to direct light from an LED located away from the light distribution panel 212. The light distribution panel 212 is configured to redirect the light made incident thereon via the light emitting diodes 214 to an upper surface of the light distribution panel 212 thereby illuminating the touch pad surface 201. The light distribution panel 212 is also configured to serve as a dielectric layer that covers the electrode layer 204 in order to help form the capacitance sensing circuit of the touch pad 200.

As shown, the LEDs 214 are attached to the printed circuit board 206 and operatively coupled to the controller 210 located on the backside of the printed circuit board 206. During operation, the controller 210 selectively adjusts the intensity of each of the LEDs 214 to illuminate portions of or all of the light distribution panel 212 in a controlled manner.

Although shown as single LEDs, the LEDs may be embodied as an array of LEDs as for example an array of red, blue and green LEDs. Arrayed LEDs such as this may be capable of generating most colors in the color spectrum.

The light distribution panel 212 can be widely varied. In one embodiment, the light distribution panel 212 is a separate component disposed within the housing 211 of the touch pad 200. For example, the light distribution panel 212 is inserted within an opening in the housing 211 (as shown). In this arrangement, it may be preferable to place the upper surface of the light distribution panel 212 flush with or recessed below the outer surface of the housing 211. Furthermore, in order to provide a tight fit that limits dust and particles from entering the touch pad 200, the light distribution panel 212 may include edges that extend over the outer surface of the housing 211.

In another embodiment, the light distribution panel 212 is an integral part of the housing 211. For example, the housing 211 is formed from a transparent or semi-transparent material. This particular embodiment provides a continuous surface without gaps or breaks, which can be aesthetically pleasing to the user.

In either embodiment, the light distribution panel 212 typically includes a portion 213 that extends below the inner surface of the housing 211. This portion 213 provides a light receiving area at the sides of the light distribution panel 212 for receiving light emitted by the side mounted LED's 214.

The light distribution panel 212, which can be formed from a single or multiple layers, is typically formed from translucent or semi-translucent dielectric materials including for example plastic materials such as polycarbonate, acrylic or ABS plastic. It should be appreciated, however, that these materials are not a limitation and that any optically transmittable dielectric material may be used.

In most cases, the light distribution panel 212 or some other component of the touch pad 200 includes light diffusing elements to diffuse the light made incident thereon in order to normalize the light intensity of the LEDs, to produce a characteristic glow at the input surface, and/or to hide the physical parts of the touch pad located underneath the input surface. The light diffusing elements may be provided on an inner surface, outer surface or they may be embedded inside the light distribution panel 212. Additionally or alternatively, the light diffusing elements can also be applied to a separate optical component disposed above the light distribution panel 212.

In one embodiment, the light diffusing element is an additive disposed inside the light distribution panel 212. For example, the light distribution panel 212 may include a plurality of light scattering particles dispersed between the top and bottom surfaces of the light distribution panel. When the light is made incident on the inner surface, it is transmitted through the light distribution panel 212 until is intersects a light scattering particle disposed inside the panel. After intersecting the light scattering particle, the light is scattered outwards in a plurality of directions, i.e., the light is reflected off the surface and/or refracted through the light scattering particle thereby creating the characteristic glow. By way of example, the light scattering particles may be formed from small glass particles or white pigments. Furthermore, by changing the amount of light scattering particles disposed in the panel, the characteristics of the glow can be altered, i.e., the greater the particles the greater the light scattering.

In another embodiment, the light diffusing element is a layer, coating and/or texture that is applied to the inner, side or outer surfaces of the panel 212. For example, the panel 212 may include a light scattering coating or a light scattering texture disposed on the side or outer surface of the panel. By way of example, the light scattering coating may be a paint, film or spray coating. In addition, the light scattering texture may be a molded surface of the wall or a sandblasted surface of the panel. When light is made incident on the inner or outer surface, it intersects the light scattering coating or texture applied on the surface. After intersecting the light scattering coating or the light scattering texture, the light is scattered outwards in a plurality of directions, i.e., the light is reflected off the surface and/or refracted through the light scattering particle thereby creating a characteristic glow.

In the illustrated embodiment, the light diffusing element is embodied as a light diffusing label 216. The light diffusing label 216 is at least adhered to the top surface of the light distribution panel 212. In some cases, the label 216 may even extend over and be adhered to a top edge of the housing wall 211. In cases such as this, the light diffusing label 216 may even be placed in a pocket formed by recesses 217 at the top edge of the housing wall 211 in order to make the top surface of the light diffusing label 216 flush with the external surface of the housing wall 211. The label 216 can have a graphic printed thereon, can have multiple colors and can have varying thickness to assist in controlling the intensity and color of the illumination. The label 216 may be formed from transparent or semitransparent dielectric materials such as Mylar or Polycarbonate or any other dielectric material that is thin, optically transmittable and includes some sort of light diffusing means.

Further, the light distribution panel 212 may be configured as a single node, or it may be broken up into plurality of distinct nodes 218, each of which includes its own dedicated light emitting diode for individual illumination thereof. During operation, when light is released by a light emitting diode 214, the light is made incident on the side of the light distribution panel 212 at the node 218. The node 218 redirects and transmits the light from its side to an upper surface of the node 218. In order to prevent light bleeding between adjacent nodes 218, each node 218 may be optically separated by a reflecting or masking region disposed therebetween.

Each of the nodes 218 may be formed from a solid piece of material or it may be formed from a combination of elements. In one embodiment, each of the nodes 218 is formed from a translucent or semi-translucent plastic insert that when combined with the other inserts forms the light distribution panel 212. In another embodiment, each of the nodes 218 is formed from a bundle of fiber optic strands.

The configuration of the nodes 218 including layout, shape and size may be widely varied. With regards to layout, the nodes 218 may be based on a Polar or Cartesian coordinate system (or some other coordinate system). With regards to shape, any shape including for example standard shapes such as circles, squares, rectangles, triangles, may be used. With regards to size, the nodes 218 may be larger than a finger or stylus, about the same size as a finger or stylus, or smaller than a finger or stylus. In one embodiment, the nodes 218 are set up similarly to the electrodes 205 of the electrode layer 204, i.e., the nodes 218 have generally the same layout, number, size and shape as the electrodes 205. In another embodiment, the nodes are set up differently. For example, the nodes 218 may have a different layout, different number, different shape and/or different size when compared to the electrodes 205.

In the illustrated embodiment, the touch pad 200 is circular and the nodes 218 are embodied as distinct angular segments (e.g., pie shaped). Any number of angular segments may be used. The number generally depends on the desired resolution of the illuminating surface. In this particular embodiment, the resolution of the light panel 202 is low and therefore each of the angular segments cover a plurality of sensing electrodes 205.

In one embodiment, all the LEDs 214 are powered at the same time to produce a fully illuminated touch pad 200. This may be analogous to backlighting. In another embodiment, the LEDs 214 are powered in accordance with the capacitance changes measured by each of the electrodes 205. For example, the segments above the detected area may be illuminated while the segments above the undetected areas may be turned off. This provides indication to the user as to their exact location of the touch surface. In yet another embodiment, selected segments may be illuminated to encourage a user to place their finger in a particular area of the touch pad.

Although only a single light panel 202 is shown, it should be appreciated that this is not a limitation and that additional light panels may be used. For example, one or more light panels may be further positioned underneath the first light panel described above. In one embodiment, each light panel in a group of light panels is configured to distribute a different color. For example, three light panels—including a red, green and blue light panel may be used. Using this arrangement, different colored segments may be produced. By controlling their intensity, almost any color can be produced (mixed) at the touch surface. In another embodiment, each light panel in the group of light panels may have a different orientation. For example, the angularly segmented nodes of the light distribution panel may be rotated relative to the other light panels so that they are placed at different positions about an axis (e.g., partially overlapping and angularly offset). Using this arrangement, leading and trailing illumination can be produced.

Figure 8A:
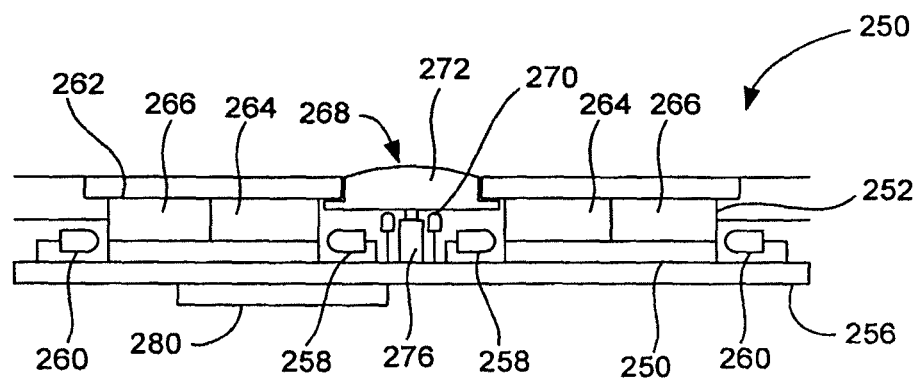
FIG. 8A is a side view of an illuminated touch pad, in accordance with one embodiment of the present invention.
Figure 8B:
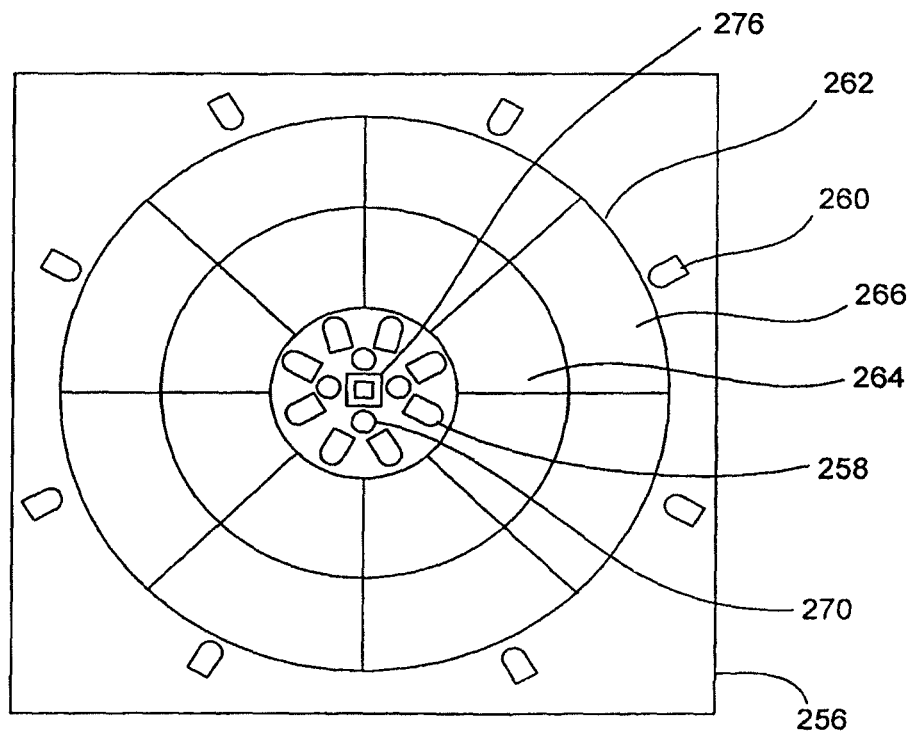
FIG. 8B is a top view, in part, of the touch pad of FIG. 8A, in accordance with another embodiment of the present invention.

FIGS. 8A and 8B are diagrams of an illuminated touch pad 250, in accordance with one embodiment of the present invention. The touch pad 250 is similar to the touch pad 200 shown in FIGS. 7A and 7B in that it includes a light panel 252, electrode layer 254 and PCB 256. It differs from the touch pad of FIGS. 7A and 7B in that the light panel 252 additionally includes inner side mounted LEDs 258 to go along with the outer side mounted LEDs 260. It also differs from the touch pad of FIGS. 7A and 7B in that the light distribution panel 262 of the light panel 252 breaks up each of the angularly segmented nodes of FIG. 7 into a pair of radially positioned nodes including inner nodes 264 and outer nodes 266 that cooperate with the respective LEDs 258 and 260. As a result, each of the nodes 264 and 266 represent both an angular and radial position in the plane of the touch pad 250. This works particularly well in touch pads with a circular shape. In addition, unlike the touch pad of FIGS. 7A and 7B, the touch pad 250 also includes a mechanical button 268 at the center of the touch pad 250. The mechanical button 268 may be illuminated with one or more center LEDs 270.

In this embodiment, both the light distribution panel 262 and the electrode layer 254 have an annular shape that creates a void at the center of the touch pad 250. The void provides a space for placement of the extra light emitting diodes 258 and 270 as well as the mechanical button 268. As shown, the inner LEDs 258 are disposed along the inner periphery of the light distribution panel 262 next to distinct inner nodes 264 of the light distribution pane 262. Furthermore, the outer LEDs 260 are disposed along the outer periphery of the light distribution panel 262 next to distinct outer nodes 266 of the light distribution panel 262.

Furthermore, the center LED 270 is disposed near the center of the touch pad 250 underneath a translucent button cap 272 of the mechanical button 270. The button cap 272 is movable trapped between a diffusing label layer 274 and a spring loaded switch 276 that is also located near the center of the touch pad 250. When the button cap is pressed, it moves against the actuator of the spring loaded switch thereby generating a button event.

In the illustrated embodiment, the electrode layer 254, LEDs 258, 260 and 270 and mechanical switch 276 are all attached to the printed circuit board 256, and operatively coupled to a controller 280 located on the backside of the PCB 256. During operation, the controller 280 monitors the signals generated at the electrode layer 254 and switch 276, and provides commands for controlling the LEDs 258, 260 and 270.

Figure 9A:
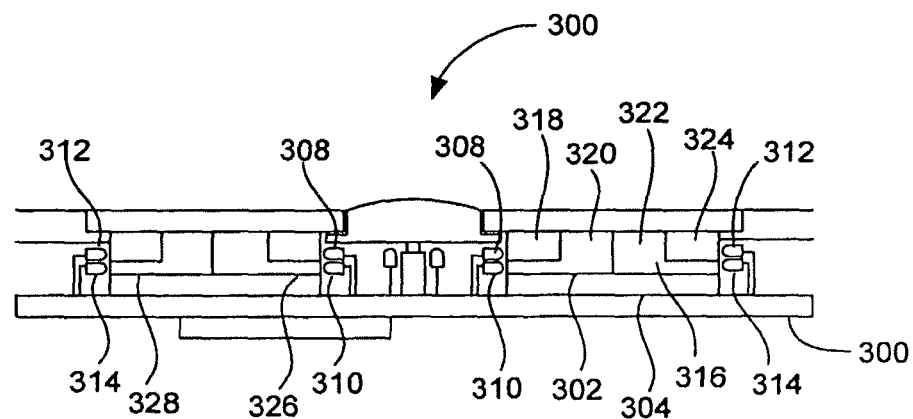
FIG. 9A is a side view of an illuminated touch pad, in accordance with one embodiment of the present invention.
Figure 9B:
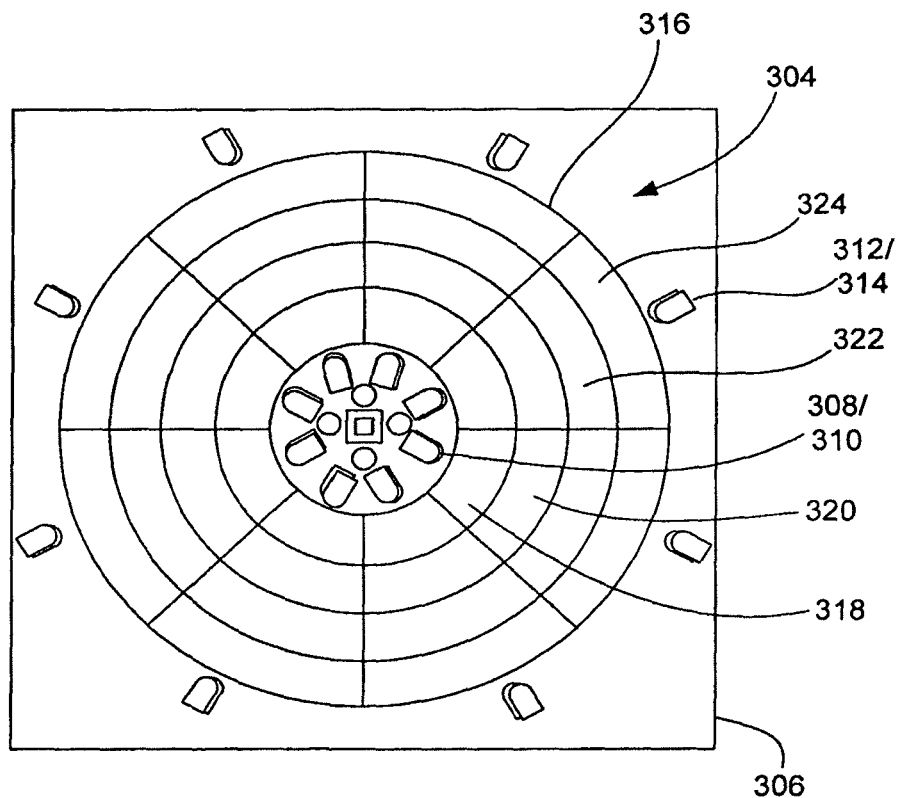
FIG. 9B is a top view, in part, of the touch pad of FIG. 7A, in accordance with another embodiment of the present invention.

FIGS. 9A and 9B are diagrams of an illuminated touch pad 300, in accordance with one embodiment of the present invention. The touch pad 300 is similar to the touch pad shown in FIGS. 8A and 8B in that it includes a light panel 302, electrode layer 304 and PCB 306. It differs from the touch pad of FIGS. 8A and 8B in that the light panel 302 includes a second set of inner LEDs 310 to go along with a first set of inner LEDs 308 and a second set of outer LEDs 314 to go along with a first set of outer LEDs 312. The first sets are located above the second sets, and may be masked from one another to prevent bleed through.

It also differs from the touch pad of FIGS. 8A and 8B in that the light distribution panel 316 of the light panel 302 further breaks up each of the angularly segmented nodes into four radially positioned nodes including inner nodes 318, inner/middle nodes 320, outer/middle nodes 322, and outer nodes 324 that optically cooperate with their respective LEDs. Particularly, the first set of inner LEDs 308 are positioned to illuminate the inner nodes 318, the second set of inner LEDs 310 are positioned to illuminate the inner/middle nodes 320, the first set of outer LEDs 312 are positioned to illuminate the outer nodes 324, and the second set of outer LEDs 314 are positioned to illuminate the outer/middle nodes 322.

In order to transmit light from the second set of inner LEDs 310 to the inner/middle nodes 320, the inner/middle nodes 320 may include a light transmitting portion 326 that extends underneath the inner nodes 318. In most cases, the light transmitting portions 326 are optically separated from the inner nodes 318 so that the light does not bleed into the inner nodes 318 when the light is passing through the light transmitting portions 326.

In order to transmit light from the second set of outer LEDs 314 to the outer/middle nodes 322, the outer/middle nodes 322 may include a light transmitting portion 328 that extends underneath the outer nodes 324. In most cases, the light transmitting portions 328 are optically separated from the outer nodes 324 so that the light does not bleed into the outer nodes 324 when the light is passing through the light transmitting portions 328. Alternatively, a light pipe may be used.

The light distribution panel 316 may be embodied in a variety of ways. In one embodiment, the light distribution panel 316 includes an outer translucent ring disposed over and around a stepped outer/middle translucent ring, and an inner translucent ring disposed over and around a stepped inner/middle translucent ring that is adjacent the outer/middle ring. A masking layer may be placed between the various rings to prevent bleed through.

Although the touch has been described with only four radial segments, it should be noted that any number of radial segments may be used as well as any number of angular segments to obtain the desired resolution.

Figure 10:
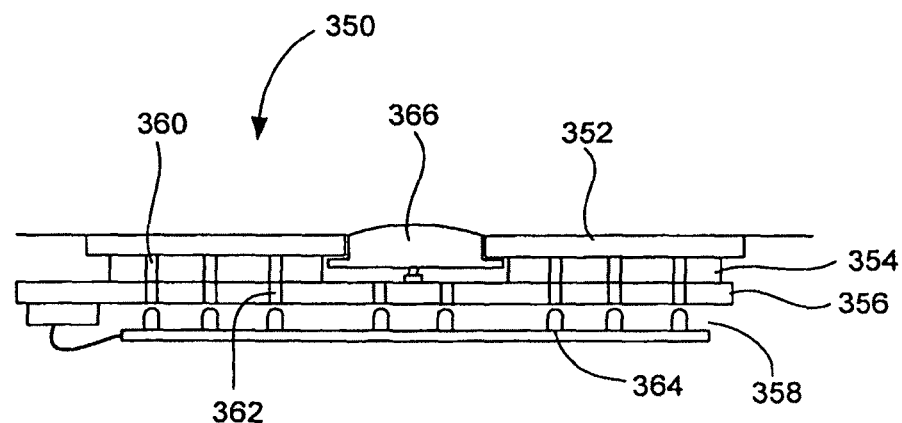
FIG. 10 is a diagram of an illuminated touch pad, in accordance with one embodiment of the present invention.

FIG. 10 is a diagram of an illuminated touch pad 350, in accordance with one embodiment of the present invention. The touch pad 350 includes various layers including a diffuser layer 352, an opaque electrode layer 354, a PCB 356 and a light panel 358. The light panel 358 may be embodied as a light panel including pixilated light sources such as the one described in FIG. 6 or a light panel including a light distribution panel and side mounted light sources such as the one described in FIG. 7.

To elaborate, the light diffuser layer 352 is disposed over the electrode layer 354, the opaque electrode layer 354 is disposed on the PCB 356, and the PCB 356 is disposed over the light panel 358. In order to illuminate the light diffuser layer 352, the electrode layer 354 includes one or more openings 360 through which light may pass when emitted from the light panel 358. The openings 360 may be the gaps that would normally be formed between the spatially separated electrodes or they may be predetermined gaps around which the spatially separated electrodes are positioned when printed on the PCB 356. Furthermore, in order to allow light to pass through the PCB 356, the PCB 356 either is formed from a translucent material or it also includes one or more openings 362 that correspond with the openings 360 of the electrode layer 354. Moreover, the light panel 358 is typically laid out similarly to the openings 360/362 so that each of the openings 360/362 includes an individual light source 364 of the light panel 358. During operation, the light emitted from each of the light sources 364 travels through the PCB 356 and through the electrode layer 354 where it illuminates either the diffuser layer 352 or a button cap 366.

Figure 11:
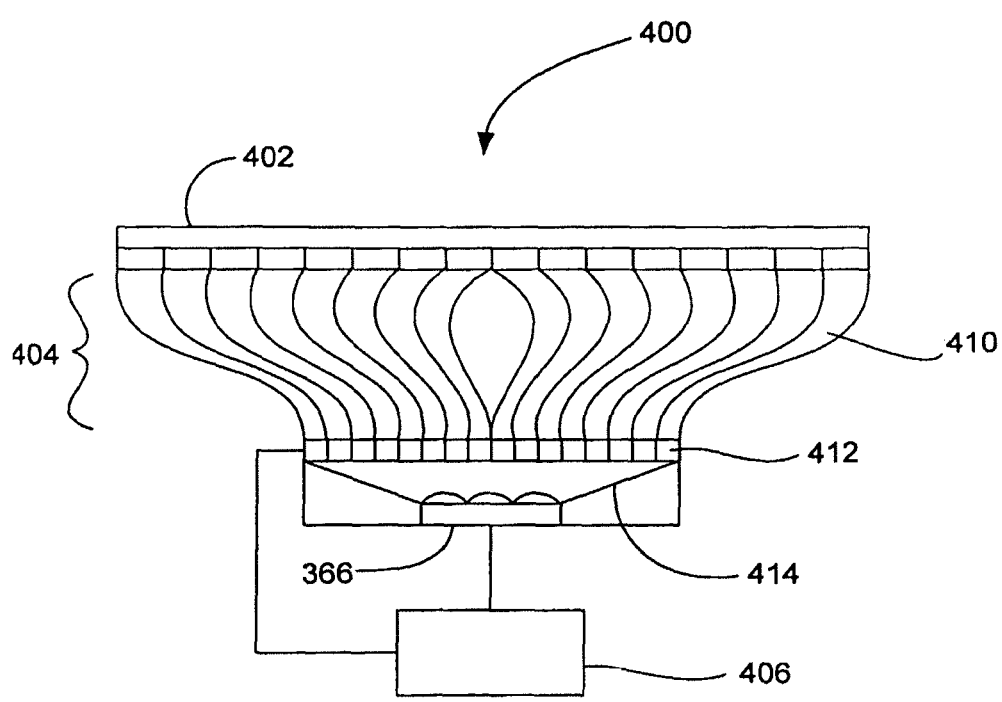
FIG. 11 is a diagram of a light panel that can be used in an illuminated touch pad, in accordance with another embodiment of the present invention.

FIG. 11 is a diagram of a light panel 400 that can be used in an illuminated touch pad, in accordance with another embodiment of the present invention. The light panel may, for example, correspond to any of those described above. The light panel 400 includes a diffuser panel 402, one or more light multiplexers 404 and a controller. The diffuser panel 402 is configured to diffuse light as described above. The light multiplexer 404, which is operatively coupled to the controller 406 and in optical communication with the diffuser panel 402, is configured to illuminate the diffuser panel 402 in a controlled and pixilated manner via commands from the controller 406.

The light multiplexer 404 includes a single light emitting device 408 and a plurality of light pipes 410 with corresponding light switches 412. The light pipe 410 may for example include one or more optical fibers, and the light emitting device 408 may be embodied in many different forms including for example one or more individual LEDs or one or more LED arrays.

The first end of each light pipe 410 is optically connected to a different point, node or region of the diffuser panel 402. The light pipes 410 can therefore form a pixilated pattern of illumination points, nodes or regions across the light diffuser panel 402. By way of example, the position of the light pipes 410 may be based on Cartesian coordinates, Polar coordinates, or some other coordinate system. The second and opposite end of each of the light pipes 410 is optically connected to a distinct light switch 412. The light switches 412 are therefore dedicated to a particular illumination point, node or region of the diffuser panel 402. Further, the light switches 412 are all in optical communication with the light emitting device 408. In some cases, the light emitting device 408 extends across the light switches 412. In other cases, the light emitted by the light emitting device 408 is focused onto the various light switches 412 via a lens or light guide 414.

Furthermore, the light switches 412 and light emitting device 408 are operatively coupled to the controller 406. During operation, the controller 406 selectively controls the light emitted by the light emitting device 408 (e.g., color and intensity), and at the same time selectively controls the opening and closing of the light switches 412. As such, the illumination provided at the diffuser panel 402 can be controlled in a pixilated manner using a single light emitting device 408. Any number of switches can be opened or closed at any particular point in time to provide the desired illumination pattern (by opening and closing different light switches, various patterns can be created). When the light is turned on and a light switch is opened, light is allowed to pass through the light switch into the associated light pipe, which carries the light from the light switch to a distinct illumination point node or region of the diffuser panel. When the light is turned on and a light switch is closed, light is blocked from entering the light pipe and therefore no illumination is provided at the corresponding point, node or region of the diffuser panel.

It should be noted that the multiplexer can include any number of switches, and the light panel can include any number of multiplexers to arrive at the desired resolution of the light panel.

Figure 12:
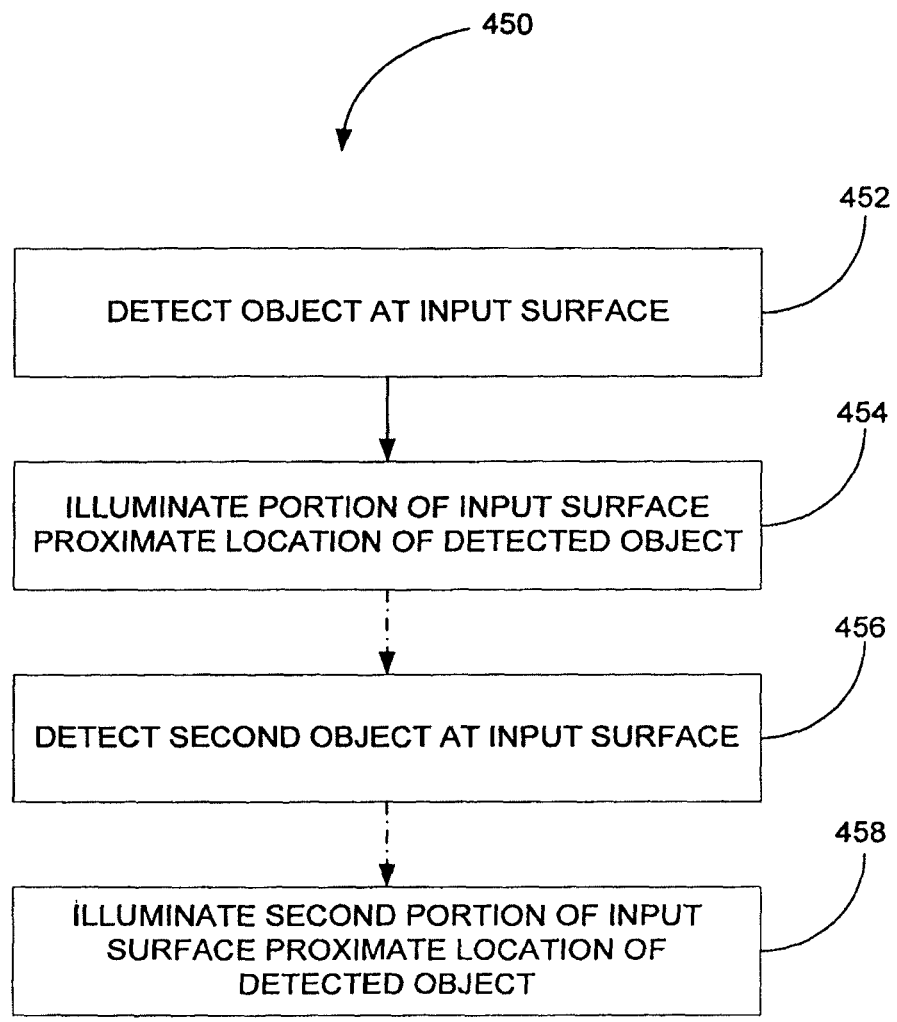
FIG. 12 is a method of operating an illuminated touch pad, in accordance with one embodiment of the present invention.
Figure 13A:
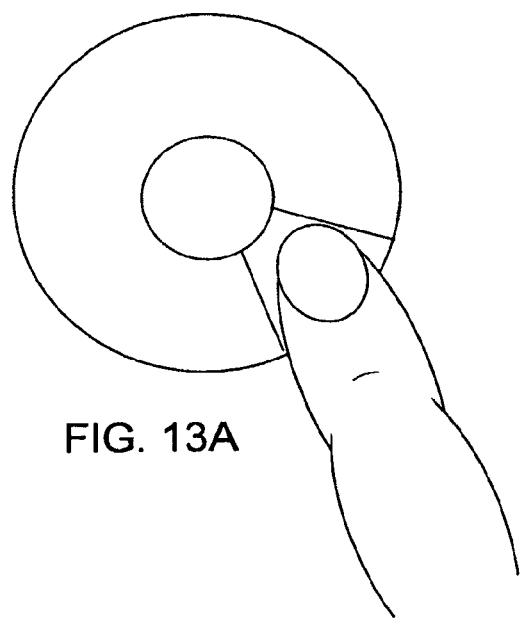
FIG. 13A illustrates one implementation where an angular segment is illuminated when the user places their finger over the angular segment, in accordance with one embodiment of the present invention.
Figure 13B:
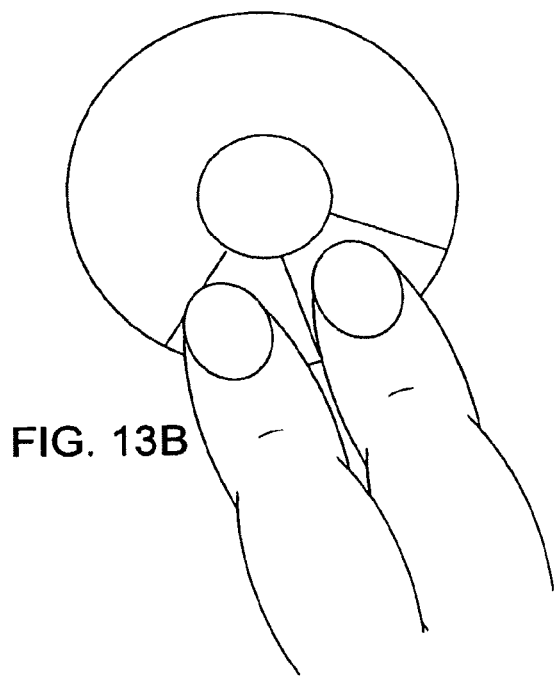
FIG. 13B illustrates one implementation where two angular segments are illuminated at the same time when two finger are distinctly placed over the two angular segments, in accordance with one embodiment of the present invention.
Figure 14A:
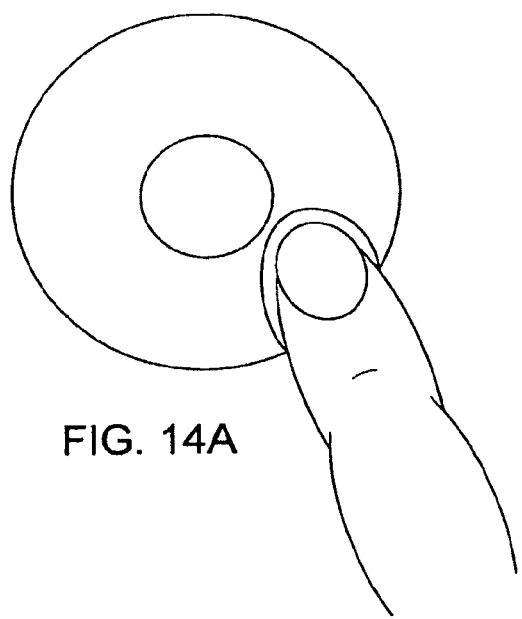
FIG. 14A illustrates one implementation where illumination points adjacent and surrounding the location of the finger are illuminated when the user places their finger over the input surface, in accordance with one embodiment of the present invention.
Figure 14B:
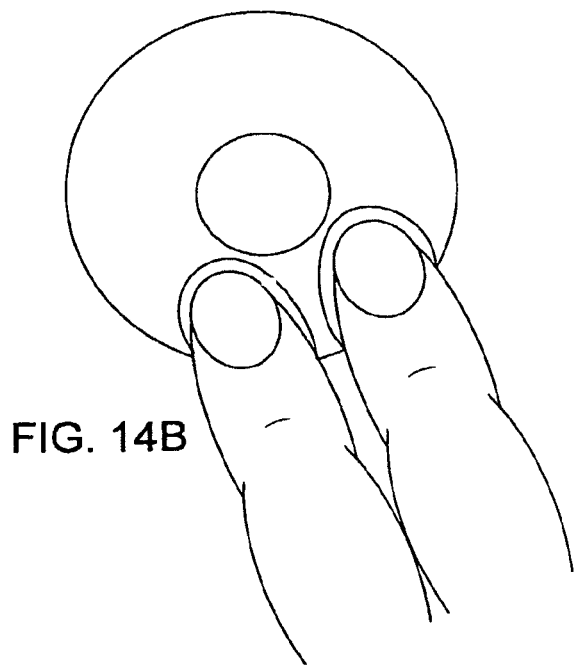
FIG. 14B illustrates one implementation where the area around two fingers are illuminated at the same time when the two finger are placed over the input surface at the same time, in accordance with one embodiment of the present invention.

FIG. 12 is a method 450 of operating an illuminated touch pad, in accordance with one embodiment of the present invention. The method includes at least blocks 452 and 454. In block 452, an object is detected over an input surface of the touch pad. This may for example be accomplished with a capacitance sensing device. In 454, at least a portion of the input surface proximate the location of the detected object is illuminated. This may be accomplished with a light panel disposed above or below the touch pad. As a result, the user will be informed where the object is located within the sensing plane at all times.

In one embodiment, the input surface is broken up into illumination regions, and whichever region is closest to the detected object is illuminated. By way of example, and referring to FIG. 13A, if the user places their finger over a single angular segment of the distribution panel that particular angular segment is illuminated. If the user simultaneously places their finger over multiple segments one of two things may occur. In one implementation, both segments are illuminated. In another implementation, only one of the segments is illuminated. In the later case, a decision may be made as to which segment is the intended segment.

In another embodiment, the input surface is broken up into illumination nodes or points (pixilated), and those points contained within and/or surrounding the detected object area are illuminated. In one implementation, at least the area adjacent the object is illuminated. By way of example, and referring to FIG. 14A, if the user places their finger over the input surface, illumination points adjacent and surrounding the location of the finger are illuminated. In some cases, the illumination points are only those points next to the finger (e.g., halo). In other cases, the illuminated points extend away from the finger as for example in a star like configuration.

The method may additionally include blocks 456 and 458. In block 456, a second object is detected over the input surface at the same time as the first object. This may for example be accomplished with a multipoint capacitance sensing device. In block 458, at least a portion of the input surface proximate the location of the second detected object is illuminated. As a result, the user will be informed where distinct multiple objects are located within the sensing plane at all times.

In one embodiment, the input surface is broken up into illumination regions, and the regions closest to the detected objects are illuminated. By way of example, and referring to FIG. 13B, when two fingers are placed over the input surface, two illumination segments in the location of the fingers are illuminated at the same time.

In another embodiment, the input surface is broken up into illumination nodes or points (pixilated), and those points contained within and/or surrounding the detected objects are illuminated. By way of example, and referring to FIG. 14B, when two finger are placed over the input surface, the area around both fingers are illuminated at the same time.

Figure 15:
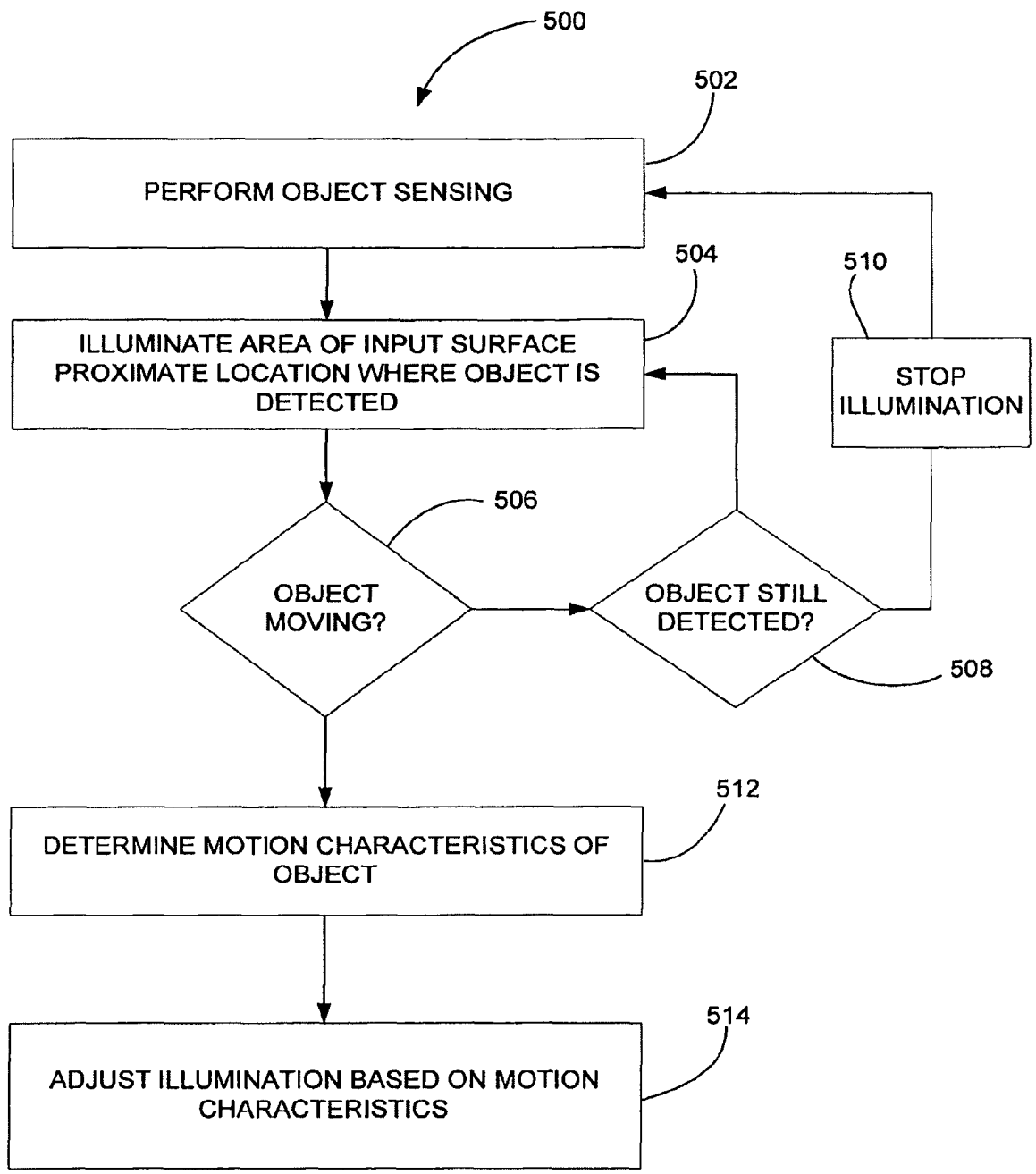
FIG. 15 is a method of operating an illuminated touch pad, in accordance with one embodiment of the present invention.

FIG. 15 is a method 500 of operating an illuminated touch pad, in accordance with one embodiment of the present invention. The method 500 generally begins at block 502 where object sensing is performed. This may for example be accomplished with a capacitive touch sensing device. In block 504, at least a portion of the input surface is illuminated when an object is detected. In most cases, the portion of the illuminated surface that is illuminated is a localized area disposed near, around, and/or underneath the location of the detected object. The illuminated portion may for example be one or more illumination points, nodes or regions. In most cases, the portion is sized similarly to the size of the object. In the case of a finger for example the illumination portion may cover an area similar to the detected area of the finger.

In block 506, a determination is made as to whether or not the object is moving. If the object is not moving, the method proceeds to block 508 where a determination is made as to whether or not the object is still detected. If the object is still detected, the method proceeds back to block 504 where the same portion of the input surface is illuminated. If the object is no longer detected, the method proceeds to block 510 where the illumination is stopped. This may occur immediately after determining that an object is no longer detected, or it may occur after a period of time (e.g., time out). Furthermore, the illumination may be stopped using an illumination effect such as fading out. Thereafter, the method proceeds back to block 502.

Referring back to block 506, if the object is moving across the input surface, the method proceeds to block 512 where motion characteristics of the object are determined. The motion characteristics may for example include acceleration, direction, and the like. Thereafter, in block 514, the characteristics of the illumination are adjusted based on one or more motion characteristics. Following blocks 514, the method proceeds back to block 506.

In one embodiment, block 514 includes moving the illumination area in accordance with the location of the moving object. That is, the illuminated portion follows the finger as the finger is moved about the input surface (i.e., the illumination tracks object movement). As a result, the user always knows where the object is located relative to the input surface. In some cases, block 514 may further include providing directional indicators around the illuminated portion in order to indicate previous and/or future locations of the object based on the motion characteristics of the moving object (e.g., acceleration, direction, etc.).

Figure 16A:
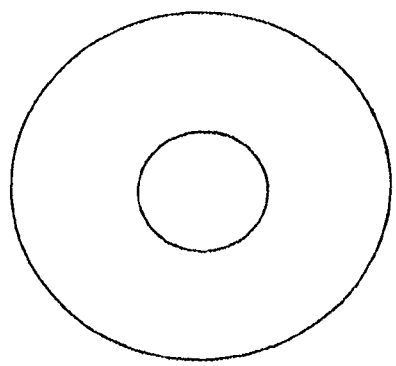
FIGS. 16A-16D illustrate one implementation where the illuminated portion follows the motion of the finger as it is moved across the surface of the touch pad, in accordance with one embodiment of the present invention.
Figure 16B:
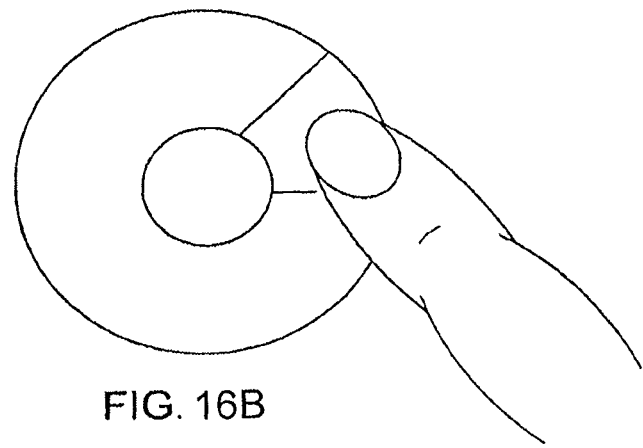
Figure 16C:
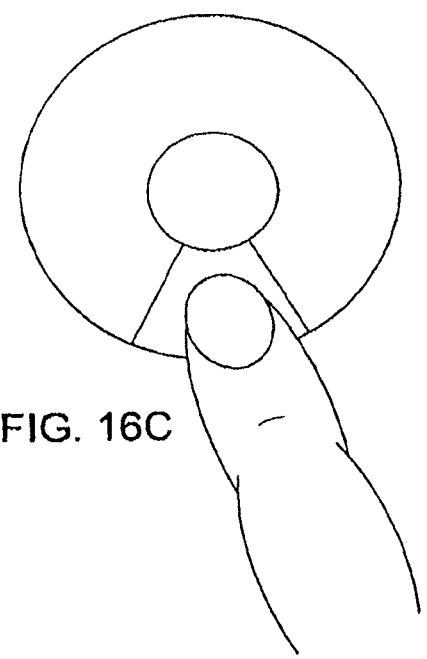
Figure 16D:
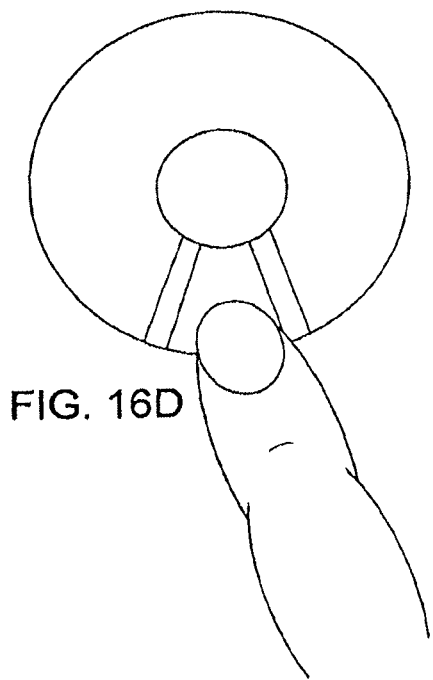

FIGS. 16A-16D illustrate one implementation where the illuminated portion follows the motion of the finger as it is moved across the surface. In this illustration, illuminated segments are configured to follow the motion of the finger as it is moved across the surface. FIG. 16A illustrates the state when no objects are detected. FIG. 16B illustrates the state when an object is detected, and the segment underneath the object is illuminated. FIG. 16C illustrates the state where the illuminated segment follows the moving finger. FIG. 16D illustrates one implementation where the illuminated segment further includes a leading edge, body and trailing edge. The leading edge indicates the direction of the motion, the body indicates the current location of the finger, and the trailing edge indicates where the finger has been.

The leading edge, body and trailing edge may have different illumination profiles. For example, the leading edge may have a high intensity level, the body may have a medium intensity level and the trailing edge may have a low intensity level. Alternatively, the leading edge may have a low intensity level, the body may have a high intensity level, and the trailing edge may have a low intensity level. Alternatively or additionally, the colors of these components may differ. For example, the leading edge may be red, the body may be orange and the trailing edge may be yellow. Furthermore, the trailing edge may include an illumination tail. For example, the trailing edge may be segmented into regions that go from higher intensity to lower intensity levels (e.g., fades outwardly from body).

Figure 17A:
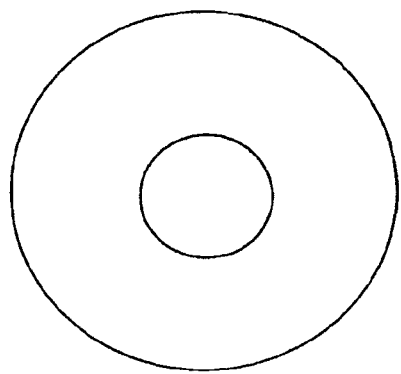
FIGS. 17A-17D illustrate one implementation where the illuminated portion follows the motion of the finger as it is moved across the surface of the touch pad, in accordance with one embodiment of the present invention.
Figure 17B:
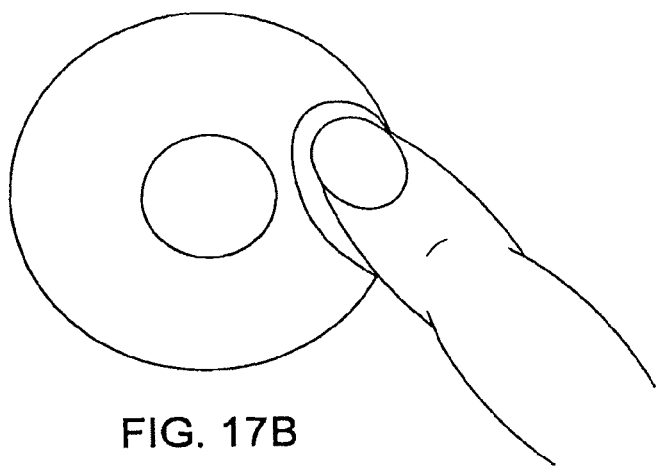
Figure 17C:
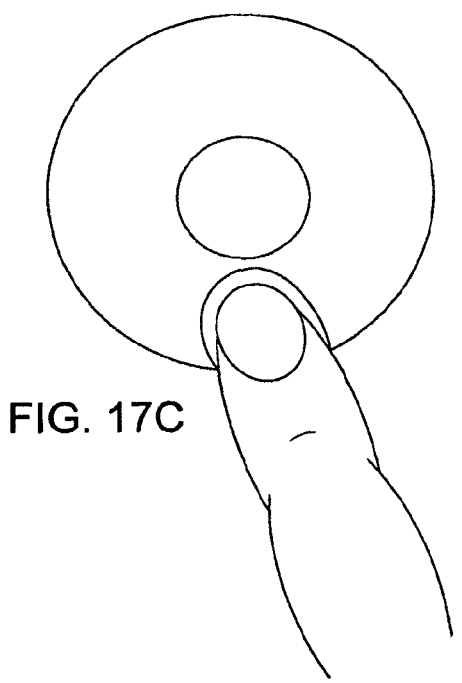
Figure 17D:
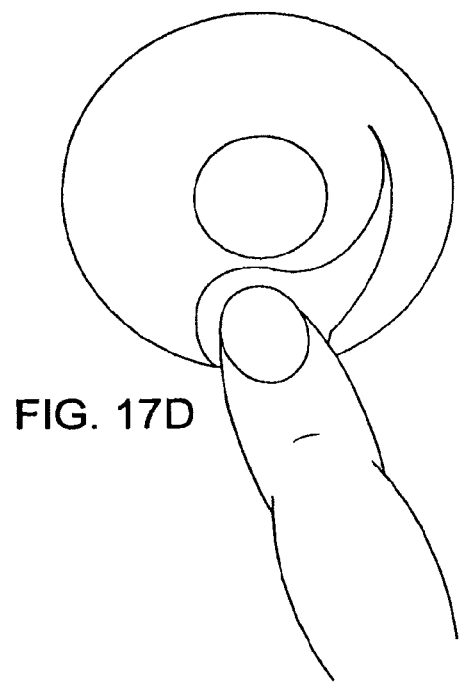

FIGS. 17A-17D illustrate another implementation where the illuminated portion follows the motion of the finger as it is moved across the surface. In this illustration, the area around the finger is illuminated and configured to follow the motion of the finger as it is moved across the surface. FIG. 17A illustrates the state when no objects are detected. FIG. 17B illustrates the state when an object is detected, and the area around the object is illuminated (e.g., halo). FIG. 17C illustrates the state where the illuminated area follows the moving finger. FIG. 17D illustrates one implementation where the illuminated area includes a body and a tail (e.g., comet). The body surrounds the finger with illumination and the tail tapers away from the body to a point. The tail trails the body as the body moves around the input surface. The tail therefore indicates the previous location of the object. The tail typically has a lower intensity level than the body. The intensity of the tail may even vary from higher to lower intensity levels as for example over its length or from its core to its edge.

Figure 18:
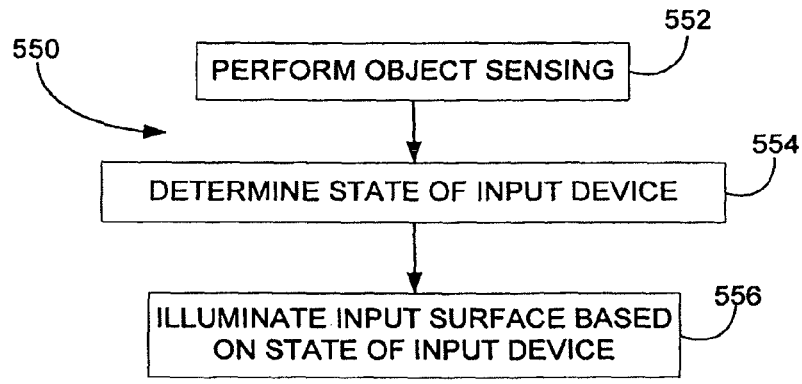
FIG. 18 is a method of operating an illuminated touch pad, in accordance with one embodiment of the present invention.
Figure 19A:
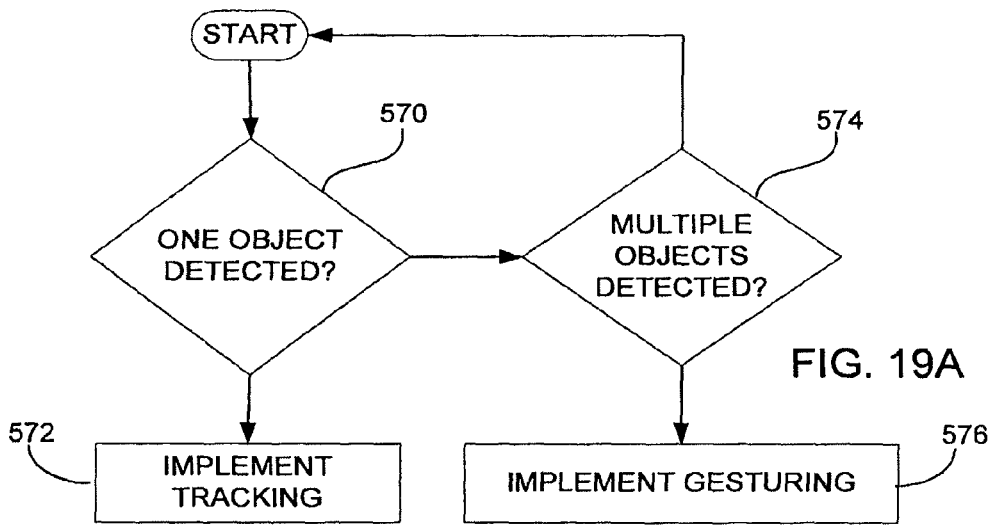
FIG. 19A is a method of determining the state of the touch pad, in accordance with one embodiment of the present invention.
Figure 19B:
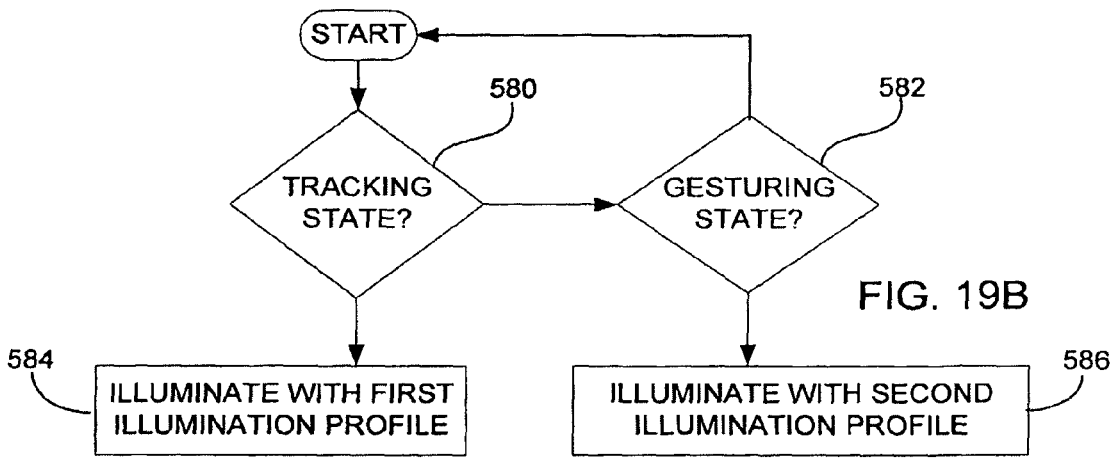
FIG. 19B is a method of illuminating a touch pad, in accordance with one embodiment of the present invention.
Figure 20A:
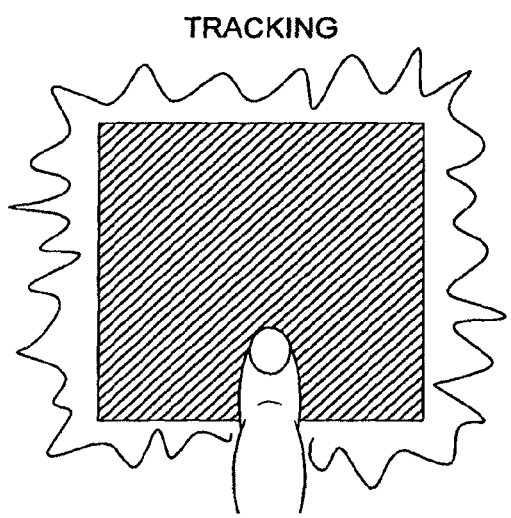
FIGS. 20A and 20B illustrate illuminating the touch pad with a first color or intensity when the touch pad is in a first state, and illuminating the touch pad with a second color or intensity when the touch pad is in a second state, in accordance with one embodiment of the present invention.
Figure 20B:
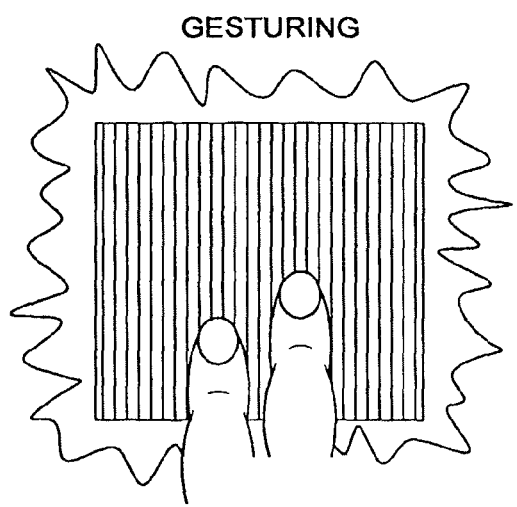

FIG. 18 is a method 550 of operating an illuminated touch pad, in accordance with one embodiment of the present invention. The method 500 generally begins at block 552 where object sensing is performed. In block 554, the state of the touch pad is determined. The states may for example be selected from a selection state, tracking state or gesture state. In a selection state, the touch pad is set up for receiving selection inputs from the user (e.g., acts like a button). In a tracking state, the touch pad is set up to track a finger as it is moved about the input surface. In a gesture state, the touch pad is set up to receive various gesture inputs from the user. An example of determining states of a touch surface may be found in U.S. patent application Ser. No. 10/903,964, which is herein incorporated by reference.

In block 556, the input surface is illuminated based on the state of the touch pad. As a result, the user is alerted to the current state of the touch pad, and therefore the type of inputs that can be made. By way of example, each state may include a different illumination profile. An illumination profile defines the illumination characteristics of the illumination to be provided. The illumination characteristics include for example intensity and/or color and/or illumination effects (e.g., fading, blinking, rastering, etc). In one example, a first state includes a first illumination profile (e.g., first color), a second state includes a second illumination profile (e.g., second color), and the third state includes a third illumination profile (e.g., third color).

Referring to 19A, one example of determining state will be described. In blocks 570 and 574, one or more objects are detected. In block 572, if a single object is detected, the touch pad is placed in a tracking state such that object motion is used to perform tracking operations. In block 576, if multiple objects are detected, the touch pad is placed in a gesturing state such that object motion is used to perform gesturing operations. By way of example, and referring to FIGS. 20A and 20B, when a single finger is detected, the touch pad is placed in a first state, and when multiple fingers are detected, the touch pad is placed in a second state.

Referring to 19B, one example of illuminating based on states will be described. In blocks 580 and 582, a determination is made as to whether the touch pad is in a tracking state or a gesturing state. In block 584, if the touch pad is in a tracking state, the touch pad is illuminated with a first illumination profile. In block 586, if the touch pad is in a gesturing state, the touch pad is illuminated with a second illumination profile that is different than the first illumination profile. The illumination profiles contain illumination information such as color, intensity and effects (e.g., blinking, fading, etc). By way of example, and referring to FIGS. 20A and 20B, when the touch pad is in a first state, the touch pad is illuminated with a first color or intensity, and when the touch pad is in a second state, the touch pad is illuminated with a second color or intensity.

In one embodiment, the method of changing illumination based on states of the touch pad may be further developed. For example, the method may include capturing a first touch image; determining the touch mode based on the first touch image; and illuminating the touch surface based on the first touch mode. The method may also include capturing a second touch image; determining the touch mode based on the second touch image; determining if the touch mode changed between the first and second touch images; if the touch mode stayed the same, comparing the first and second touch images and performing a control function based on the comparison; and if the touch mode changed, illuminating the touch surface based on the second touch mode. The method additionally includes capturing a third touch image; determining the touch mode based on the third touch image; determining if the touch mode changed between the second and third touch images; if the touch mode stayed the same, comparing the second and third touch images and performing a control function based on the comparison; and if the touch mode changed, illuminating the touch surface based on the third touch mode.

Figure 21:
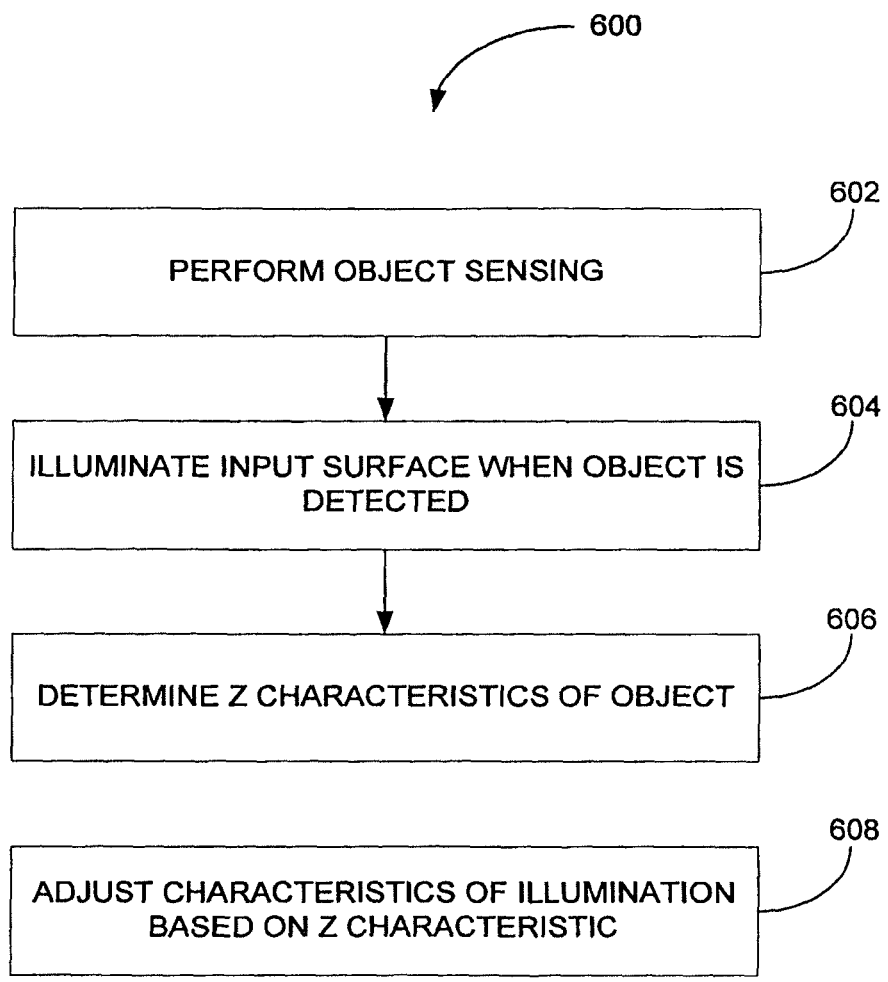
FIG. 21 is a method of operating an illuminated touch pad, in accordance with one embodiment of the present invention.

FIG. 21 is a method 600 of operating an illuminated touch pad, in accordance with one embodiment of the present invention. The method generally begins at block 602 where an object is detected. In block 604, a least a portion of the input surface is illuminated when the object is detected. In block 606, z characteristics of the object are determined. The z characteristics may include the pressure being exerted on the input surface by the object, and/or the location of the object in the z direction relative to the x-y input surface (e.g., how close the object is to the x-y plane). In block 608, the illumination characteristics are adjusted based on the z-characteristic. For example, the color and/or intensity of the illumination may be adjusted based on the z height or pressure.

Figure 22A:
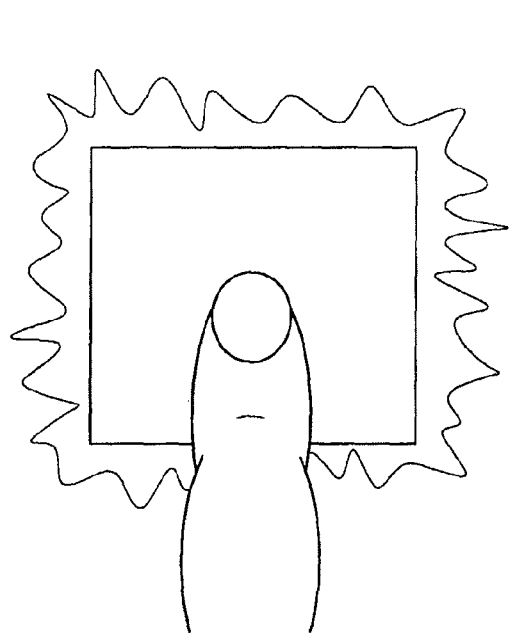
FIGS. 22A and 22B illustrate increasing the intensity of the illumination when an object is closer or exerts increased pressure relative to the touch surface, and decreasing the intensity of the illumination when an object is further away or exerts decreased pressure relative to the touch surface, in accordance with one embodiment of the present invention.
Figure 22B:
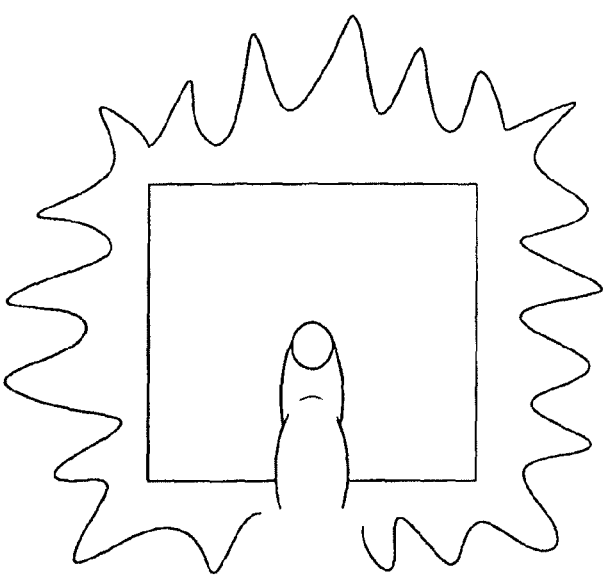

By way of example, and referring to FIGS. 22A and 22B, the entire touch pad may be illuminated when the object is detected, and the intensity of the illumination may be increased when an object is closer or exerts increased pressure relative to the touch surface, and the intensity may be decreased when an object is further away or exerts decreased pressure relative to the touch surface. Alternatively, only a portion of the touch pad may be illuminated (as for example a segment or the area directly adjacent the finger) and the intensity of the illumination may be increased when an object is closer or exerts increased pressure relative to the touch surface, and the intensity may be decreased when an object is further away or exerts decreased pressure relative to the touch surface.

Figure 23:
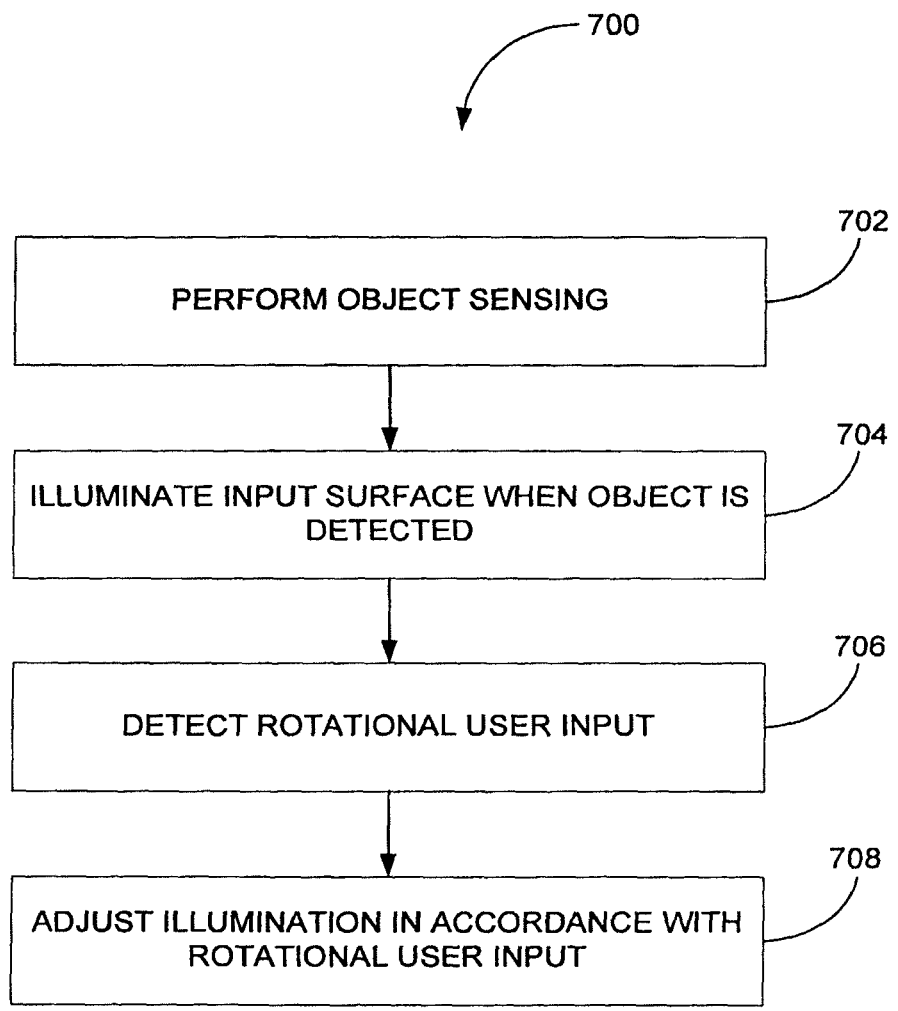
FIG. 23 is a method of operating an illuminated touch pad, in accordance with one embodiment of the present invention.

FIG. 23 is a method 700 of operating an illuminated touch pad, in accordance with one embodiment of the present invention. The method generally begins at block 702 where an object sensing is performed. In block 704, at least a portion of the input surface is illuminated in response to the sensed object. For example, a segment or the area around a finger may be illuminated. Thereafter in block 706, a rotational user input is detected over the input surface. For example, in the case of a circular touch pad, the rotational user input may be the user swirling their finger around the circular touch pad. In some cases, this may include determining an acceleration value pertaining to the rotational user input. In block 708, the input surface is illuminated in accordance with the rotational user input. For example, the region of the touch pad underneath the finger is illuminated as the user rotates their finger around the circular touch pad. In some cases, this may include moving through illumination segments, nodes or points based on at least the acceleration value, whereby the acceleration value specifies a degree of acceleration associated with the rate at which said moving through illumination segments, nodes or points is to be achieved.

Rotational user inputs are further described in U.S. patent application Ser. Nos. 10/256,716 and 10/259,159, which are herein incorporated by reference.

Figure 24:
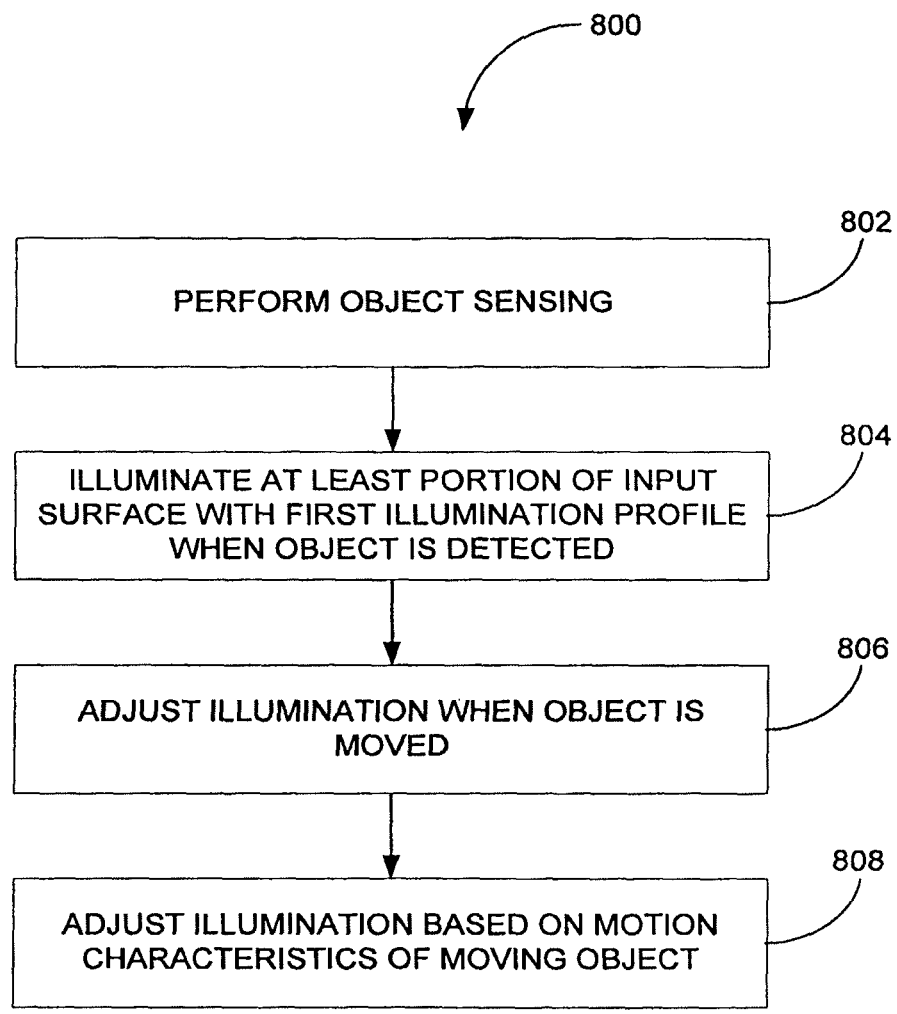
FIG. 24 is a method of operating an illuminated touch pad, in accordance with one embodiment of the present invention.
Figure 25A:
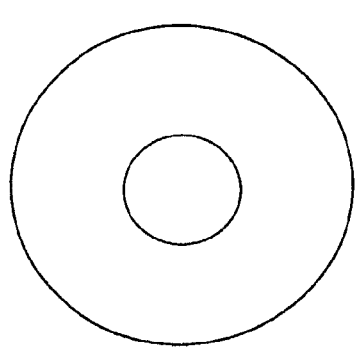
FIG. 25 illustrates providing low intensity illumination when a touch is first detected, providing medium intensity illumination when the object is slowly moved around the input surface (e.g., low acceleration), and providing high intensity illumination when the object is quickly moved around the input surface (e.g., high acceleration), in accordance with one embodiment of the present invention.
Figure 25B:
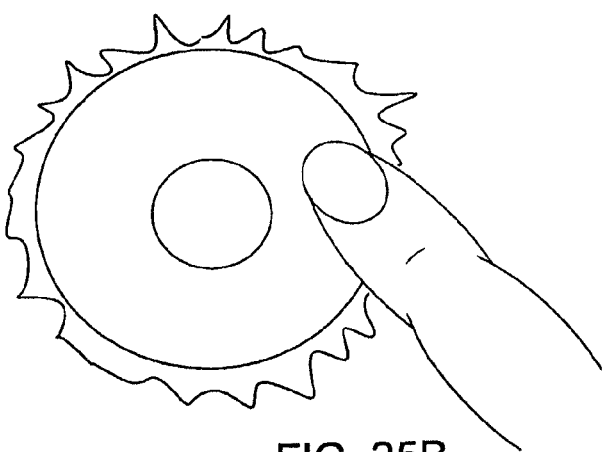
Figure 25C:
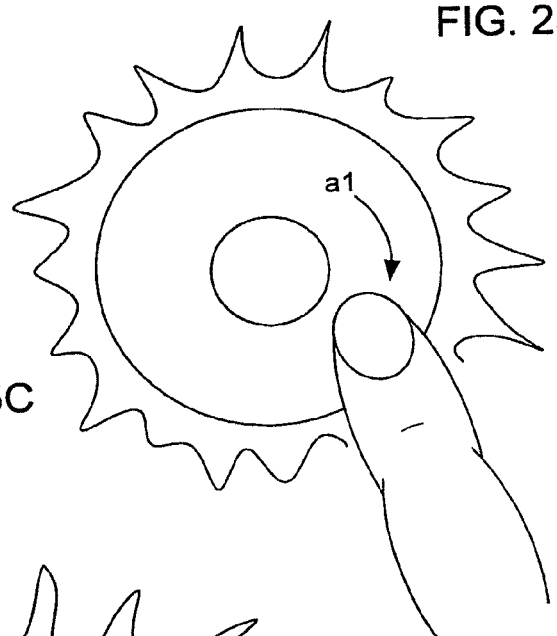
Figure 25D:
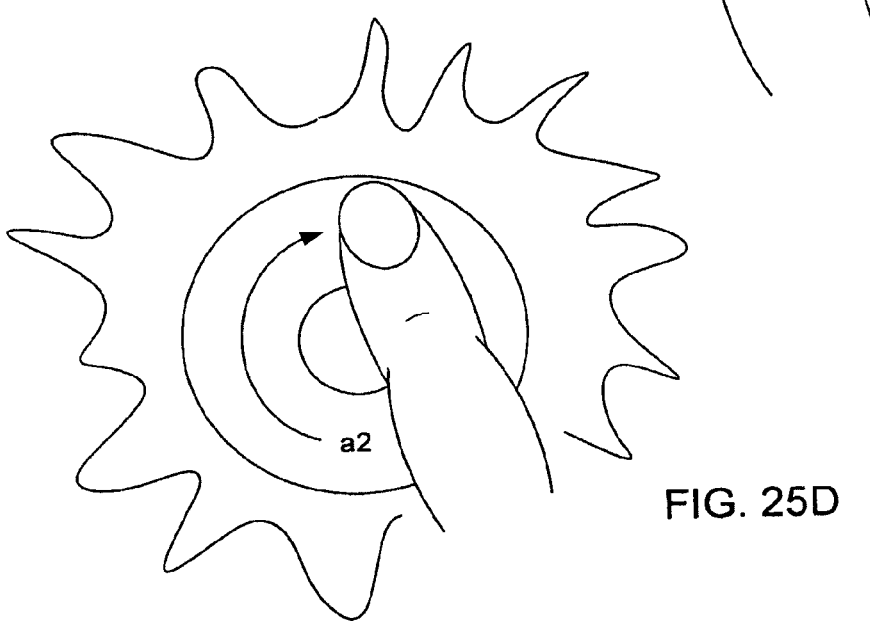

FIG. 24 is a method 800 of operating an illuminated touch pad, in accordance with one embodiment of the present invention. The method generally begins at block 802 where at least a portion of the input surface is illuminated with a first illumination profile when an object is detected proximate the input surface. Following block 802, the method proceeds to block 804 where the illumination of illuminated portion of the input surface changes when the object is moved. For example, the intensity of the illumination may be varied based on the acceleration of the moving object. For example, the intensity may be increased with increased acceleration and the intensity may be decreased with decreased acceleration. In another embodiment, thresholds are used. For example, a first intensity level may be used for high acceleration, a second intensity level may be used for low acceleration, and a third intensity level may be used for no acceleration (stationary).

By way of example and referring to FIG. 25, low intensity illumination is provided when a touch is first detected, medium intensity illumination is provided when the object is slowly moved around the input surface (e.g., low acceleration), and high intensity illumination is provided when the object is quickly moved around the input surface (e.g., high acceleration). Alternatively, the intensity may continuously vary according to the acceleration of the object.

While this invention has been described in terms of several preferred embodiments, there are alterations, permutations, and equivalents, which fall within the scope of this invention.

For example, although the invention was primarily directed at touch pads, it should be pointed out that this is not a limitation and that invention may be applied to other touch sensing devices as for example touch sensitive housings and touch sensing palm rests. An example of a touch sensitive housing may be found in U.S. patent application Ser. No. 11/115,539, which is herein incorporated by reference.

It should also be noted that there are many alternative ways of implementing the methods and apparatuses of the present invention.

For example, different areas of the touch pad may be illuminated with different illumination profiles at the same time. By way of example, the touch pad may be segmented into illuminated quadrants that correspond to button functionality of the touch pad such as menu, play/pause, forward and reverse. See for example U.S. patent application Ser. No. 10/643,256, which is herein incorporated by reference.

Furthermore, the touch pad may be used as an indicator for a handheld computing device such as a media player. For example, the touch pad may be configured to ebb in and out when the device is in sleep mode or vary from high to low intensity based on the battery level. Other examples of controlling light may be found in U.S. patent application Ser. Nos. 10/889,933, 10/075,964 and 10/075,520, all of which are herein incorporated by reference.

Moreover, the touch pad may be used as a timer or clock. In the case of a clock, the touch pad may include segments corresponding to the position of a clock, and the segments can be illuminated in a controlled manner to indicate the current time. For example, to indicate 12:30, a 12 o'clock segment may be illuminated with a first illumination profile and 6 o'clock segment may be illuminated with a second illumination profile. In the case of a timer, the touch pad may be used to show how much time is left in a playing media item such as a song. For example, the entire touch pad may be illuminated when the song starts and consecutive segments may be turned off as the song plays. When the song is over, the touch pad is no longer illuminated. Alternatively, consecutive segments may be turned on as the song plays until the song is over and the touch pad is fully illuminated. The may be useful in a media player such as a music player.

In addition, the illumination of the touch pad may be further controlled by a sensor such as a light sensor. The light sensor measures the ambient light level, and the intensity of the illumination is adjusted based on the ambient light level. Examples of light arrangements that utilize ambient light sensors may be found in U.S. patent application Ser. No. 10/402,311, which is herein incorporated by reference.

It is therefore intended that the following appended claims be interpreted as including all such alterations, permutations, and equivalents as fall within the true spirit and scope of the present invention.

The invention claimed is:

1. An input device comprising:
an input surface; and
a controller configured to
detect a user input associated with one or more objects relative to the input surface,
determine whether the user input comprises a single object or multiple objects,
illuminate the input surface based on a first illumination profile if the user input is determined to comprise a single object, and
illuminate the input surface based on a second illumination profile if the user input is determined to comprise multiple objects such that the input surface is illuminated based on the same second illumination profile irrespective of how many of the multiple objects the user input is determined to comprise.

2. The input device as recited in claim 1 wherein the controller is configured to place the input device in a tracking state if the user input is determined to comprise a single object.

3. The input device as recited in claim 2 wherein in the tracking state the input device is configured to track the single object as the single object moves relative to the input surface.

4. The input device as recited in claim 1 wherein the controller is configured to place the input device in a gesture state if the user input is determined to comprise multiple objects.

5. The input device as recited in claim 4 wherein in the gesture state the input device is configured to receive a gesture input from the multiple objects.

6. The input device as recited in claim 1 wherein the first illumination profile specifies a first color with which the input surface is to be illuminated and the second illumination profile specifies a second color with which the input surface is to be illuminated.

7. The input device as recited in claim 1 wherein the first illumination profile specifies a first intensity of light with which the input surface is to be illuminated and the second illumination profile specifies a second intensity of light with which the input surface is to be illuminated.

8. The input device as recited in claim 1 wherein the first illumination profile specifies a first visual effect with which the input surface is to be illuminated and the second illumination profile specifies a second visual effect with which the input surface is to be illuminated.

9. The input device as recited in claim 8 wherein the first visual effect and the second visual effect comprise a blinking effect.

10. The input device as recited in claim 8 wherein the first visual effect and the second visual effect comprise a fading effect.

11. A method of operating an input device, comprising:
detecting a user input associated with one or more objects relative to an input surface;

determining whether the user input comprises a single object or multiple objects;

illuminating the input surface based on a first illumination profile if the user input is determined to comprise a single object; and illuminating the input surface based on a second illumination profile if the user input is determined to comprise multiple objects such that the input surface is illuminated based on the same second illumination profile irrespective of how many of the multiple objects the user input is determined to comprise.

12. The method as recited in claim 11 comprising placing the input device in a tracking state if the user input is determined to comprise a single object.

13. The method as recited in claim 12 wherein in the tracking state the input device is configured to track the single object as the single object moves relative to the input surface.

14. The method as recited in claim 11 comprising placing the input device in a gesture state if the user input is determined to comprise multiple objects.

15. The method as recited in claim 14 wherein in the gesture state the input device is configured to receive a gesture input from the multiple objects.

16. The method as recited in claim 11 wherein the first illumination profile specifies a first color with which the input surface is to be illuminated and the second illumination profile specifies a second color with which the input surface is to be illuminated.

17. The method as recited in claim 11 wherein the first illumination profile specifies a first intensity of light with which the input surface is to be illuminated and the second illumination profile specifies a second intensity of light with which the input surface is to be illuminated.

18. The method as recited in claim 11 wherein the first illumination profile specifies a first visual effect with which the input surface is to be illuminated and the second illumination profile specifies a second visual effect with which the input surface is to be illuminated.

19. The method as recited in claim 18 wherein the first visual effect and the second visual effect comprise a blinking effect.

20. The method as recited in claim 18 wherein the first visual effect and the second visual effect comprise a fading effect.

* * * * *